US009857983B2

(12) United States Patent
Lin et al.

(10) Patent No.: US 9,857,983 B2
(45) Date of Patent: Jan. 2, 2018

(54) SOLID STATE DRIVE AND FLASH TRANSLATION LAYER TABLE REBUILDING METHOD THEREOF

(71) Applicants: Lite-On Electronics (Guangzhou) Limited, Guangzhou (CN); LITE-ON TECHNOLOGY CORPORATION, Taipei (TW)

(72) Inventors: Liang-You Lin, Taipei (TW); Yu-Chuang Peng, Taipei (TW); Ya-Ping Pan, Taipei (TW); Ho-An Lin, Taipei (TW)

(73) Assignees: LITE-ON ELECTRONICS (GUANGZHOU) LIMITED, Guangzhou (CN); LITE-ON TECHNOLOGY CORPORATION, Taipei (TW)

( * ) Notice: Subject to any disclaimer, the term of this patent is extended or adjusted under 35 U.S.C. 154(b) by 50 days.

(21) Appl. No.: 15/147,169

(22) Filed: May 5, 2016

(65) Prior Publication Data

US 2017/0235495 A1 Aug. 17, 2017

(30) Foreign Application Priority Data

Feb. 17, 2016 (CN) .......................... 2016 1 0089827

(51) Int. Cl.
*G06F 3/06* (2006.01)
*G06F 12/02* (2006.01)

(52) U.S. Cl.
CPC ............ *G06F 3/0607* (2013.01); *G06F 3/065* (2013.01); *G06F 3/0659* (2013.01); *G06F 3/0688* (2013.01); *G06F 12/0246* (2013.01); *G06F 2212/7201* (2013.01); *G06F 2212/7205* (2013.01); *G06F 2212/7209* (2013.01)

(58) Field of Classification Search
CPC ...... G06F 3/065; G06F 3/0688; G06F 3/0607; G06F 3/0659
USPC .......................................................... 711/103
See application file for complete search history.

(56) References Cited

U.S. PATENT DOCUMENTS

| | | | | |
|---|---|---|---|---|
| 7,444,462 | B2 | 10/2008 | Traister et al. | |
| 9,367,444 | B2 * | 6/2016 | Hashimoto ......... | G06F 12/0246 |
| 2013/0304971 | A1 * | 11/2013 | Ishikawa ............. | G06F 12/0246 711/103 |
| 2015/0106556 | A1 * | 4/2015 | Yu ........................ | G11C 16/349 711/103 |
| 2015/0277785 | A1 * | 10/2015 | Liang .................. | G06F 12/0246 711/103 |
| 2017/0206006 | A1 * | 7/2017 | Liao ........................ | G06F 3/061 |

* cited by examiner

*Primary Examiner* — Pierre-Michel Bataille
(74) *Attorney, Agent, or Firm* — WPAT, PC

(57) ABSTRACT

A flash translation layer table rebuilding method for a solid state drive is provided. The solid state drive includes a non-volatile memory and a buffering circuit. Firstly, a flash translation layer table is loaded from the non-volatile memory to the buffering circuit. In case that an abnormal shutdown event occurs, plural blocks of the non-volatile memory to be read are determined according to a specified block programming serial number of the flash translation layer table. Then, a read sequence of reading the plural blocks is determined according to a block programming serial number or an auxiliary serial number corresponding to the block. The contents of the blocks are read according to the read sequence. A mapping relationship between plural physical allocation addresses and plural logical block addresses of the flash translation layer table is updated.

7 Claims, 18 Drawing Sheets

SOLID STATE DRIVE AND FLASH TRANSLATION LAYER TABLE REBUILDING METHOD THEREOF

This application claims the benefit of People's Republic of China Application Serial No. 201610089827.3, filed Feb. 17, 2016, the subject matter of which is incorporated herein by reference.

FIELD OF THE INVENTION

The present invention relates to a solid state drive and a control method for the solid state drive, and more particularly to a solid state drive and a flash translation layer table rebuilding method for the solid state drive.

BACKGROUND OF THE INVENTION

As is well known, a solid state drive (SSD) is a data storage device that uses a non-volatile memory to store data. After data are written to the flash memory, if no electric power is supplied to the flash memory, the data are still retained in the solid state drive. FIG. 1 is a schematic functional block diagram illustrating a conventional solid state drive. As shown in FIG. 1, the solid state drive 10 comprises a controlling circuit 110, a buffering circuit 130 and a non-volatile memory 120. The controlling circuit 110 is in communication with a host 12 through an external bus 20. Consequently, commands and data can be exchanged between the controlling circuit 110 and the host 12. Generally, the external bus 20 is a USB bus, an SATA bus, a PCIe bus, or the like. For example, the buffering circuit 130 is a volatile memory such as a dynamic random access memory (DRAM).

Moreover, the storage space of the buffering circuit 130 is divided into plural storage areas. For example, the first storage area of the buffering circuit 130 is a data buffering area 132. The write data from host 12 or the valid data to be moved during a garbage collection of the non-volatile memory 120 can be temporarily stored in the data buffering area 132. For example, when the host 12 intends to store the write data into the non-volatile memory 120, the write data received by the controlling circuit 110 through the external bus 20 are temporarily stored into the data buffering area 132. Alternatively, while the garbage collection of the non-volatile memory 120 is performed by the controlling circuit 110, the valid data to be moved are temporarily stored into the data buffering area 132. Moreover, the write data or the valid data are written from the data buffering area 132 to the non-volatile memory 120 at proper time. A second storage area of the buffering circuit 130 is used for storing a flash translation layer table (FTL table) 136. The data in the non-volatile memory 120 of the solid state drive 10 can be quickly accessed by the controlling circuit 110 through the FTL table. The functions of the FTL table 136 will be described as follows.

Generally, the host 12 defines the data addresses of the solid state drive 10 through logical block addresses (LBAs). Moreover, the non-volatile memory 120 defines the data addresses of the non-volatile memory 120 through physical allocation addresses (PAAs). Consequently, the solid state drive 10 should have a FTL table for mapping LBA into PAA. The FTL table is stored in the buffering circuit 130.

For example, when a write command is issued from the host 12, a LBA is also issued from the host 12 to notify the controlling circuit 110 to store the write data into the LBA. Then, the PAA of the non-volatile memory 120 for storing the write data is determined by the controlling circuit 110. Moreover, the relationship between the LBA and the PAA is recorded in the FTL table 136 by the controlling circuit 110. According to the recoded contents of the FTL table 136, the controlling circuit 110 can search the PAA corresponding to the LBA and search the write data from the non-volatile memory 120.

As mentioned above, the relationship between the LBA and the PAA is recorded in the FTL table 136. If the contents of the FTL table 136 are erroneous, the controlling circuit 110 cannot find out the data. In case that electric power is normally supplied to the solid state drive 10, the FTL table 136 is stored in the buffering circuit 130. Consequently, the relationship between the LBA and the PAA can be quickly read, stored and updated.

Before the electric power supplied to the solid state drive 10 is stopped, the FTL table 136 is written back to the non-volatile memory 120 by the controlling circuit 110. After the electric power is no longer supplied to the solid state drive 10, the FTL table 136 stored in the buffering circuit 130 is deleted.

As mentioned above, the FTL table 136 has been written to the non-volatile memory 120 before the electric power supplied to the solid state drive 10 is stopped. Consequently, after the solid state drive 10 is powered again, the FTL table in the non-volatile memory 120 is loaded into the buffering circuit 130 by the controlling circuit 110. Consequently, the solid state drive 10 can be normally operated.

When the controlling circuit 110 intends to move the temporarily-stored data from the data buffering area 132 to the non-volatile memory 120, the controlling circuit 110 selects a first blank block of the non-volatile memory 120 as an open block and provides a block programming serial number to the first blank block. Then, the data in the data buffering area 132 are stored into the open block of the non-volatile memory 120.

After the open block is occupied by the data, the controlling circuit 110 will select a second blank block the non-volatile memory 120 as the open block and provide a new block programming serial number to the second blank block. The new block programming serial number is the original new block programming serial number plus one. Then, the data in the data buffering area 132 are stored into the open block of the non-volatile memory 120. In other words, the block programming serial number is associated with the sequence of programming the blocks of the non-volatile memory 120. Except that the solid state drive 10 is formatted to zero the block programming serial number, the block programming serial number of the non-volatile memory 120 gradually increases.

FIGS. 2A~2H schematically illustrate the actions of the conventional solid state drive. It is assumed that the non-volatile memory 120 has six blocks B1~B6 and each block has four storage spaces. For example, b11 denotes the PAA of the first storage space of the first block B1, b12 denotes the PAA of the second storage space of the first block B1, and the rest may be deduced by analog. Moreover, the terms "a", "c", "e" and "x" denote specified numbers.

Firstly, when the electric power is received by the solid state drive, the contents of the FTL table in a reserved area of the non-volatile memory 120 are loaded into the FTL table 136 of the buffering circuit 130. Please refer to the FTL table 136 of FIG. 2A. Since the PAA b21 is mapped to the LBA (a), the first storage space of the second block B2 stores the data D1 of the LBA (a). Since the PAA b22 is mapped to the LBA (a+3), the second storage space of the second block B2 stores the data D2 of the LBA (a+3). Since the PAA b23 is mapped to the LBA (e), the third storage space of the second block B2 stores the data D3 of the LBA (e). Since the PAA b24 is mapped to the LBA (c+1), the fourth storage space of the second block B2 stores the data D4 of the LBA (c+1). The rest of the FTL table 136 may be deduced by analog.

Moreover, the block programming serial numbers (SN) of the second block B2, the fifth block B5 and the third block B3 are (x), (x+1) and (x+2), respectively. Consequently, the second block B2 is firstly programmed, then the fifth block B5 is programmed, and finally the third block B3 is programmed. Moreover, the FTL table 136 also records the last block programming serial number (i.e., SN:x+2) before the previous normal shutdown. After the solid state drive 10 is powered again, the controlling circuit 110 can confirm the storing condition of the non-volatile memory 120 according to the contents of the FTL table 136. After the controlling circuit 110 confirms the storing condition, the solid state drive 10 is in the normal working state.

Please refer to FIG. 2B. The solid state drive 10 is in the normal working state. The controlling circuit 110 receives a write command from the host 12. The write command intends to provide data D5', D2', D11' and D8' to update the data D5, D2, D11 and D8 in the LBAs (a+2)~(a+5). Meanwhile, the data D5', D2', D11' and D8' are temporarily stored in the data buffering area 132.

Please refer to FIG. 2C. The controlling circuit 110 selects the first block B1 as the open block, and provides the block programming serial number (x+3) to the first block B1. Moreover, the block programming serial number in the FTL table 136 is updated (i.e., SN:x+3). Then, the data D5', D2', D11' and D8' in the data buffering area 132 are written into the four storage spaces of the open block (i.e., the first block B1) by the controlling circuit 110, and the FTL table 136 is updated. Generally, in addition to the data D5', D2', D11' and D8', the LBAs corresponding to the data D5', D2', D11' and D8' are also stored in the four storage spaces of the first block B1 of the non-volatile memory 120.

Please refer to FIG. 2C again. Since the data D5', D2', D11' and D8' are stored in the open block (i.e., the first block B1), the PAAs (b11)~(b14) in the FTL table 136 are mapped to the LBAs (a+2)~(a+5), respectively. Moreover, the PAAs (b31), (b22), (b53) and (b34) storing the old data D5, D2, D11 and D8 are mapped to the invalid LBA (FF). In the FTL table 136 as shown in FIG. 2C, the data in the storage spaces corresponding to the PAAs (b31), (b22), (b53) and (b34) are invalid data.

Please refer to FIG. 2D. The controlling circuit 110 receives a write command from the host 12. The write command intends to provide data D3', D9', D7' and D12' to update the data D3, D9, D7 and D12 in the LBAs (e)~(e+3). Meanwhile, the data D3', D9', D7' and D12' are temporarily stored in the data buffering area 132.

Please refer to FIG. 2E. The controlling circuit 110 selects the sixth block B6 as the open block, and provides the block programming serial number (x+4) to the sixth block B6. Moreover, the block programming serial number in the FTL table 136 is updated (i.e., SN:x+4). Then, the data D3', D9', D7' and D12' in the data buffering area 132 are written into the four storage spaces of the open block (i.e., the sixth block B6) by the controlling circuit 110, and the FTL table 136 is updated.

Please refer to FIG. 2E again. Since the data D3', D9', D7' and D12' are stored in the open block (i.e., the sixth block B6), the PAAs (b61)~(b64) in the FTL table 136 are mapped to the LBAs (e)~(e+3), respectively. Moreover, the PAAs (b23), (b51), (b33) and (b54) storing the old data D3, D9, D7 and D12 are mapped to the invalid LBA (FF). In the FTL table 136 as shown in FIG. 2E, the data in the storage spaces corresponding to the PAAs (b23), (b51), (b33) and (b54) are invalid data.

In case that the non-volatile memory 120 contains a great number of invalid data, the controlling circuit 110 performs a garbage collection. Consequently, the valid data D6 and D10 in the third block B3 and the fifth block B5 are moved to the data buffering area 132 by the controlling circuit 110. While the garbage collection is performed, the controlling circuit 110 can still receive the command from the host. As shown in FIG. 2F, the controlling circuit 110 receives a write command from the host 12. The write command intends to provide a data D13 to the LBA (c+2) and provide an updated data D11" to the LBA (a+4). In addition, the data D13 and D11" are also stored in the data buffering area 132.

Please refer to FIG. 2G. The controlling circuit 110 selects the fourth block B4 as the open block, and provides the block programming serial number (x+5) to the fourth block B4. Moreover, the block programming serial number in the FTL table 136 is updated (i.e., SN:x+5). Then, the data D6, D10, D13 and D11" in the data buffering area 132 are written into the four storage spaces of the open block (i.e., the fourth block B4) by the controlling circuit 110, and the FTL table 136 is updated.

Please refer to FIG. 2G again. Since the data D6 and D10 are stored in the open block (i.e., the fourth block B4), the PAAs (b32) and (b52) storing the old data D6 and D10 are mapped to the invalid LBA (FF). Moreover, the PAAs (b41), (b42), (b43) and (b44) in the FTL table 136 are mapped to the LBAs (c), (a+1), (c+2) and (a+4), respectively. Moreover, in the FTL table 136, the PAA (b13) storing the old data D11' is mapped to invalid LBA (FF). The data in the storage spaces corresponding to the invalid LBA (FF) are invalid data. In the FTL table 136 as shown in FIG. 2G, the data in the storage spaces corresponding to the PAAs (b13), (b32) and (b52) are invalid data. Moreover, the data in the storage spaces corresponding to the PAAs (b31)~(b34) and (b51)~(b54) are also invalid data. Consequently, the data in the storage spaces of the third block B3 and the fifth block B5 are all invalid data.

As mentioned above, the data in the storage spaces of the third block B3 and the fifth block B5 are all invalid data. Consequently, after the valid data are moved in the garbage collection, the third block B3 and the fifth block B5 are erased as the blank blocks (see FIG. 2H). Under this circumstance, the block programming serial numbers (x+2) and (x+1) are also erased. Moreover, after the FTL table 136 is updated, the PAAs (b31)~(b34) and (b51)~(b54) have no mapping relationship to the LBAs. According to the contents of the FTL table 136, the third block B3 and the fifth block B5 become the blank blocks.

If a shutdown command is received by the controlling circuit 110 in the situation of FIG. 2H, it means that the solid state drive 10 will be normally shut down. Consequently, after the contents of the FTL table 136 are stored to the reserved area of the non-volatile memory 120 by the controlling circuit 110, the electric power supplied to the solid state drive 10 is interrupted. Moreover, after the solid state drive 10 is powered again, the FTL table in the non-volatile memory 120 is loaded into the FTL table 136 of the buffering circuit 130 by the controlling circuit 110. Consequently, the solid state drive 10 can be normally operated.

However, if the solid state drive 10 in the situation of FIG. 2H is not normally shut down, some problems may occur. For example, since the controlling circuit 110 does not receive the shutdown command from the host 12, the contents of the FTL table 136 in the buffering circuit 130 cannot be immediately stored to the non-volatile memory 120. That is, the contents of the FTL table 136 in the buffering circuit 130 disappear.

For solving the above problems, the controlling circuit 110 realizes that the previous power interruption is resulted from an abnormal shutdown according to a power flag after the solid state drive 10 is powered again. Then, the controlling circuit 110 has to rebuild the contents of the FTL table 136. After the contents of the FTL table 136 are rebuilt, the solid state drive 10 can be normally operated. A conventional method of rebuilding the contents of the FTL table 136 after the solid state drive 10 in the situation of FIG. 2H is suffered from abnormal shutdown will be described as follows.

FIGS. 3A~3E schematically illustrate a conventional method of rebuilding the FTL table of the solid state drive. In case that the solid state drive 10 is powered again after the abnormal shutdown, the contents of the FTL table 136 corresponding to the previous shutdown are not reserved in the reserved area of the non-volatile memory 120.

Please refer to FIG. 3A. The contents of the non-volatile memory 120 are identical to those of the non-volatile memory 120 as shown in FIG. 2H. Moreover, the contents of the FTL table 136 are identical to the contents of the FTL table 136 as shown in FIG. 2A because the contents of the FTL table 136 as shown in FIG. 2A are stored before the previous normal shutdown. Moreover, the controlling circuit 110 realizes that the previous power interruption is resulted from an abnormal shutdown according to a power flag. Consequently, it is necessary to rebuild the FTL table.

As shown in FIG. 3A, the controlling circuit 110 realizes that only the FTL table 136 corresponding to the block programming serial number (x+2) is updated according to the block programming serial number (i.e., SN:x+2). Consequently, it is necessary to sequentially update the FTL table 136 from the block programming serial number (x+2) to the largest block programming serial number.

Please refer to FIG. 3B. The controlling circuit 110 updates the FTL table 136 to the block programming serial number (SN:x+3), and reads the contents of the first block B1 corresponding to the block programming serial number (x+3). As mentioned above, the storage spaces of the blocks in the non-volatile memory 120 not only store data but also store the LBAs corresponding to the data. Consequently, while the controlling circuit 110 reads the contents of the first block B1 corresponding to the block programming serial number (x+3), the stored data and the corresponding LBAs are also acquired. In this embodiment, the data D5', D2', D11' and D8 in the first storage space, the second storage space, the third storage space and the fourth storage space of the first block B1 correspond to the LBAs (a+2), (a+3), (a+4) and (a+5), respectively. Consequently, the controlling circuit 110 updates the FTL table 136. That is, the PAA (b11) corresponds to the LBA (a+2), the PAA (b12) corresponds to the LBA (a+3), the PAA (b13) corresponds to the LBA (a+4), and the PAA (b14) corresponds to the LBA (a+5). Moreover, after the PAA (b31) corresponding to the LBA (a+2) is updated, the PAA (b31) corresponds to the invalid LBA (FF). After the PAA (b22) corresponding to the LBA (a+3) is updated, the PAA (b22) corresponds to the invalid LBA (FF). After the PAA (b53) corresponding to the LBA (a+4) is updated, the PAA (b53) corresponds to the invalid LBA (FF). After the PAA (b34) corresponding to the LBA (a+5) is updated, the PAA (b34) corresponds to the invalid LBA (FF).

Please refer to FIG. 3C. The controlling circuit 110 updates the FTL table 136 to the block programming serial number (SN:x+4), and reads the contents of the sixth block B6 corresponding to the block programming serial number (x+4). In this embodiment, the data D3', D9', D7' and D12' in the four storage spaces of the sixth block B6 correspond to the LBAs (e), (e+1), (e+2) and (e+3), respectively. Consequently, the controlling circuit 110 updates the FTL table 136. That is, the PAA (b61) corresponds to the LBA (e), the PAA (b62) corresponds to the LBA (e+1), the PAA (b63) corresponds to the LBA (e+2), and the PAA (b64) corresponds to the LBA (e+3). Moreover, after the PAA (b23) corresponding to the LBA (e) is updated, the PAA (b23) corresponds to the invalid LBA (FF). After the PAA (b51) corresponding to the LBA (e+1) is updated, the PAA (b51) corresponds to the invalid LBA (FF). After the PAA (b33) corresponding to the LBA (e+2) is updated, the PAA (b33) corresponds to the invalid LBA (FF). After the PAA (b54) corresponding to the LBA (e+3) is updated, the PAA (b54) corresponds to the invalid LBA (FF).

Please refer to FIG. 3D. The controlling circuit 110 updates the FTL table 136 to the block programming serial number (SN:x+5), and reads the contents of the fourth block B4 corresponding to the block programming serial number (x+5). In this embodiment, the data D6, D10, D13 and D11" in the four storage spaces of the fourth block B4 correspond to the LBAs (c), (a+1), (c+2) and (a+4), respectively. Consequently, the controlling circuit 110 updates the FTL table 136. That is, the PAA (b41) corresponds to the LBA (c), the PAA (b42) corresponds to the LBA (a+1), the PAA (b43) corresponds to the LBA (c+2), and the PAA (b44) corresponds to the LBA (a+4). Moreover, after the PAA (b32) corresponding to the LBA (c) is updated, the PAA (b32) corresponds to the invalid LBA (FF). After the PAA (b52) corresponding to the LBA (a+1) is updated, the PAA (b52) corresponds to the invalid LBA (FF). After the PAA (b13) corresponding to the LBA (a+4) is updated, the PAA (b13) corresponds to the invalid LBA (FF).

Since the largest block programming serial number in the non-volatile memory 120 is (x+5), the contents of the FTL table 136 as shown in FIG. 3D are arranged by the controlling circuit 110. Moreover, since all of the PAAs (b31)~(b34) and (b51)~(b54) correspond to the invalid LBA (FF), the controlling circuit 110 confirms that the third block B3 and the fifth block B5 are the blank blocks. Consequently, after the FTL table 136 is updated, the PAAs (b31)~(b34) and (b51)~(b54) have no mapping relationship to the LBAs (see FIG. 3E).

Obviously, the contents of FIG. 3E are completely identical to the contents of FIG. 2H. Meanwhile, the FTL table 136 is successfully rebuilt by the controlling circuit 110, and the FTL table 136 is restored to the state before the abnormal shutdown. Consequently, the solid state drive 10 can be normally operated.

FIG. 4 is a flowchart illustrating a method of rebuilding the FTL table of the solid state drive according to prior art. After the solid state drive 10 receives electric power (Step S410), the controlling circuit 110 loads the contents of the FTL table from the reserved area of the non-volatile memory 120 and builds the FTL table 136 in the buffering circuit 130 (Step S420).

Then, the controlling circuit 110 judges whether an abnormal shutdown event occurs according to a power flag (Step S430). If no abnormal shutdown event occurs, the solid state drive 10 is normally operated (Step S450). Whereas, if the abnormal shutdown event occurs, the contents of the blocks of the non-volatile memory 120 corresponding to the block programming serial numbers larger than the block programming serial number of the FTL table 136 are sequentially read, and the PAA-LBA mapping relationship in the FTL table 136 is updated (Step S440). Then, the solid state drive 10 is normally operated (Step S450).

SUMMARY OF THE INVENTION

An embodiment of the present invention provides a solid state drive. The solid state drive is in communication with a host. The solid state drive includes a controlling circuit, a non-volatile memory and a buffering circuit. The controlling circuit is connected with the host. The non-volatile memory is connected with the controlling circuit. The non-volatile memory includes plural blocks. The buffering circuit is connected with the controlling circuit. A storage space of the buffering circuit is divided into a first data buffering area, and a second data buffering area. A write data from the host is temporarily stored in the first data buffering area by the controlling circuit. A valid data to be moved during a garbage collection of the non-volatile memory is temporarily stored in the second data buffering area by the controlling circuit. The write data is written from the first data buffering area to a first block of the non-volatile memory, and the controlling circuit provides a first block programming serial number to the first block. The valid data is written from the second data buffering area to a second block of the non-volatile memory, and the controlling circuit provides a second block programming serial number and a first auxiliary serial number to the second block.

Another embodiment of the present invention provides a flash translation layer table rebuilding method for a solid state drive. The solid state drive includes a non-volatile memory and a buffering circuit. The flash translation layer table rebuilding method includes the following steps. Firstly, a flash translation layer table is loaded from the non-volatile memory to the buffering circuit. Then, plural blocks of the non-volatile memory to be read are determined according to a specified block programming serial number of the flash translation layer table. Then, a read sequence of reading the plural blocks is determined according to a block programming serial number or an auxiliary serial number corresponding to the block, the contents of the blocks are read according to the read sequence, and a mapping relationship between plural physical allocation addresses and plural logical block addresses of the flash translation layer table is updated. The plural blocks of the non-volatile memory have corresponding block programming serial numbers, and a part of the plural blocks have corresponding auxiliary serial numbers.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

The present invention provides a solid state drive and a flash translation layer table rebuilding method for the solid state drive. For increasing the accessing speed of the solid state drive, a buffering circuit of the solid state drive is equipped with plural data buffering areas to receive data from different sources, and a non-volatile memory of the solid state drive is equipped with plural open blocks for storing the data corresponding to the plural data buffering areas. In case that the solid state drive is suffered from an abnormal shutdown event, the flash translation layer table rebuilding method of the present invention can be used to rebuild the flash translation layer table. The flash translation layer table rebuilding method can be applied to the solid state drive with plural buffering areas and/or plural open blocks.

Figure 1:
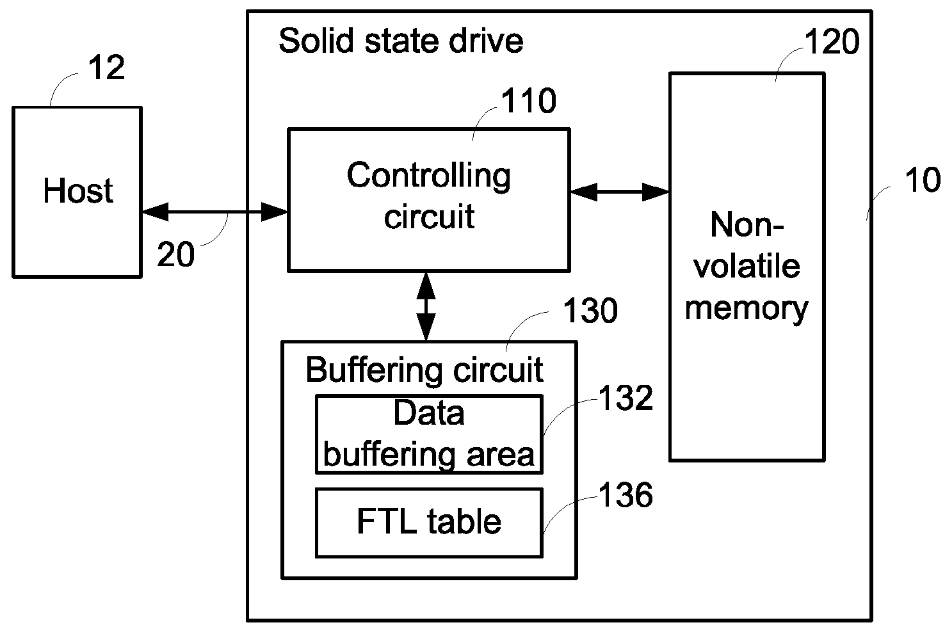
FIG. 1 (prior art) is a schematic functional block diagram illustrating a conventional solid state drive.
Figure 2A:
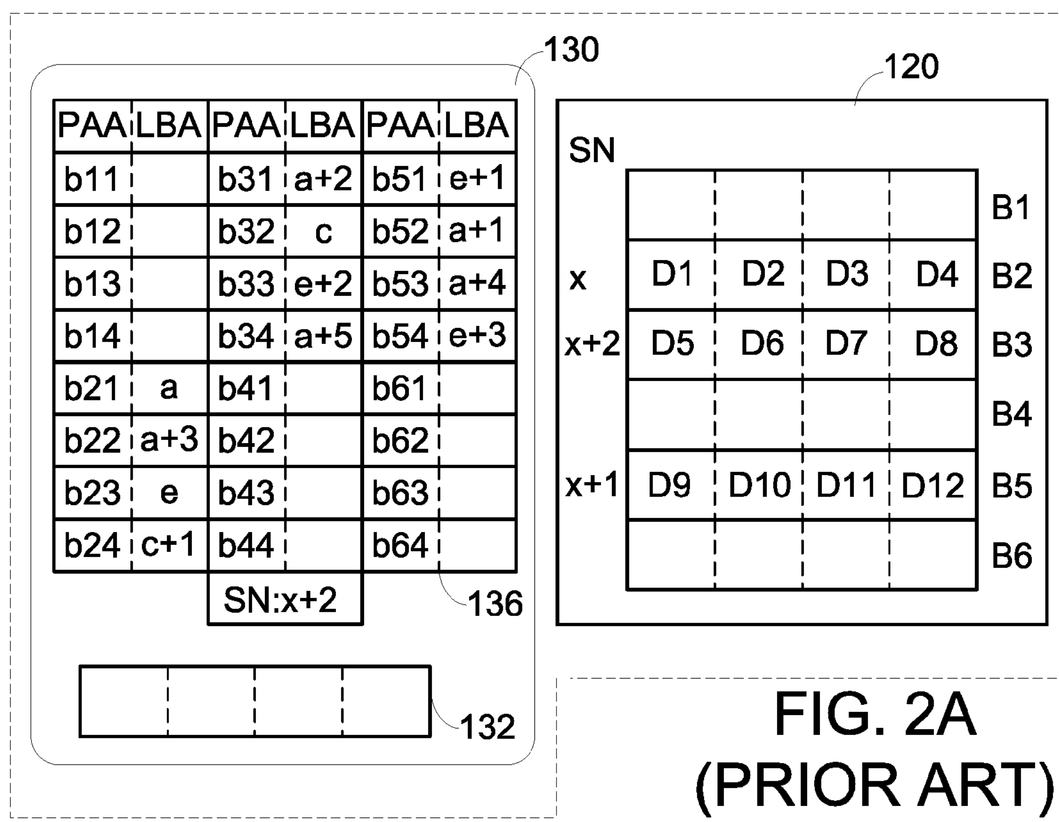
FIGS. 2A~2H (prior art) schematically illustrate the actions of the conventional solid state drive.
Figure 2B:
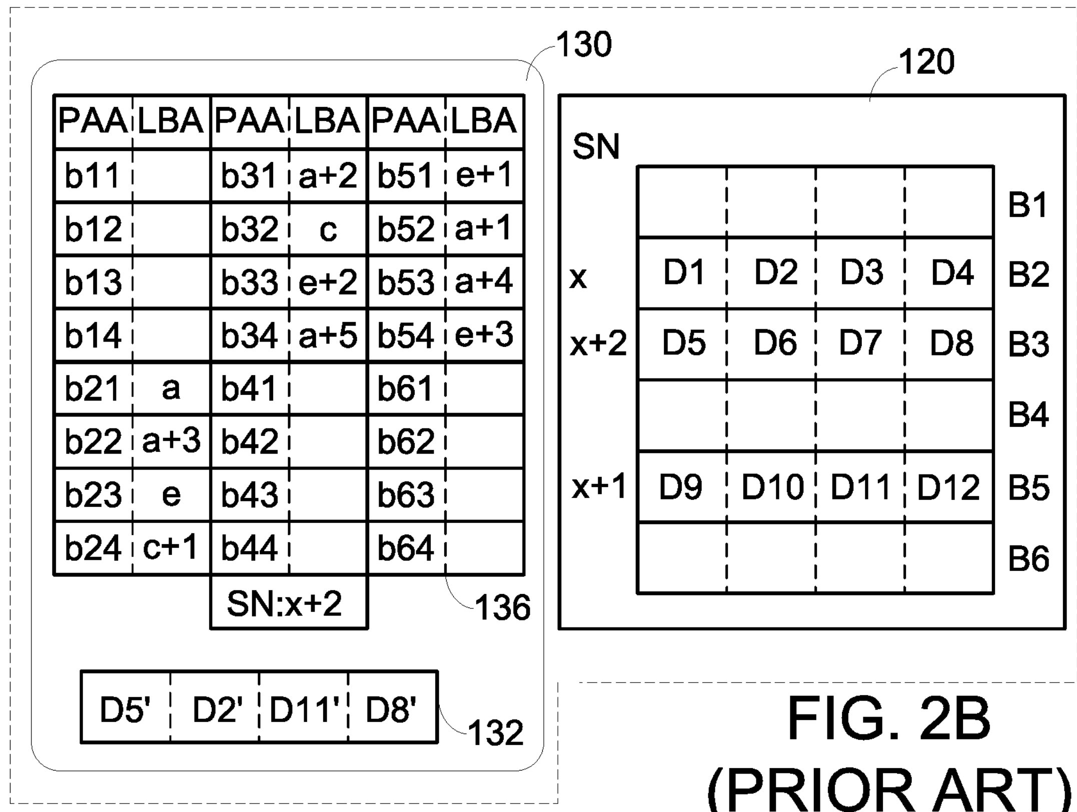
Figure 2C:
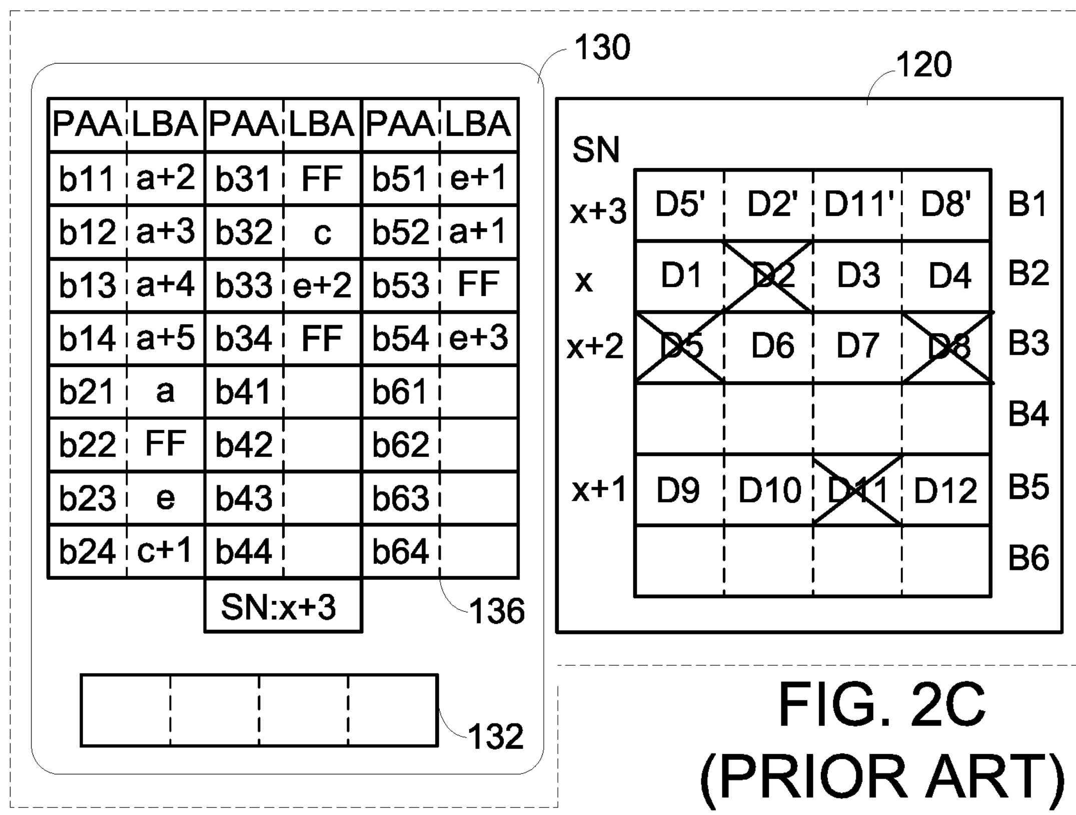
Figure 2D:
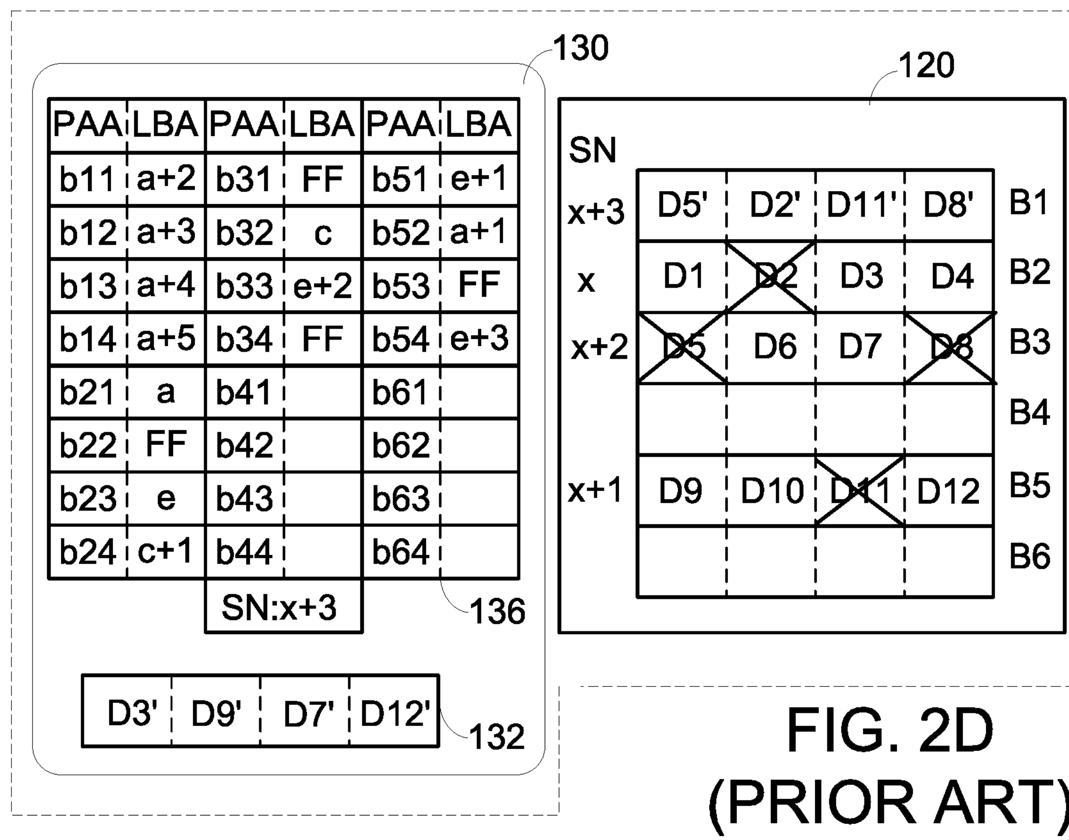
Figure 2E:
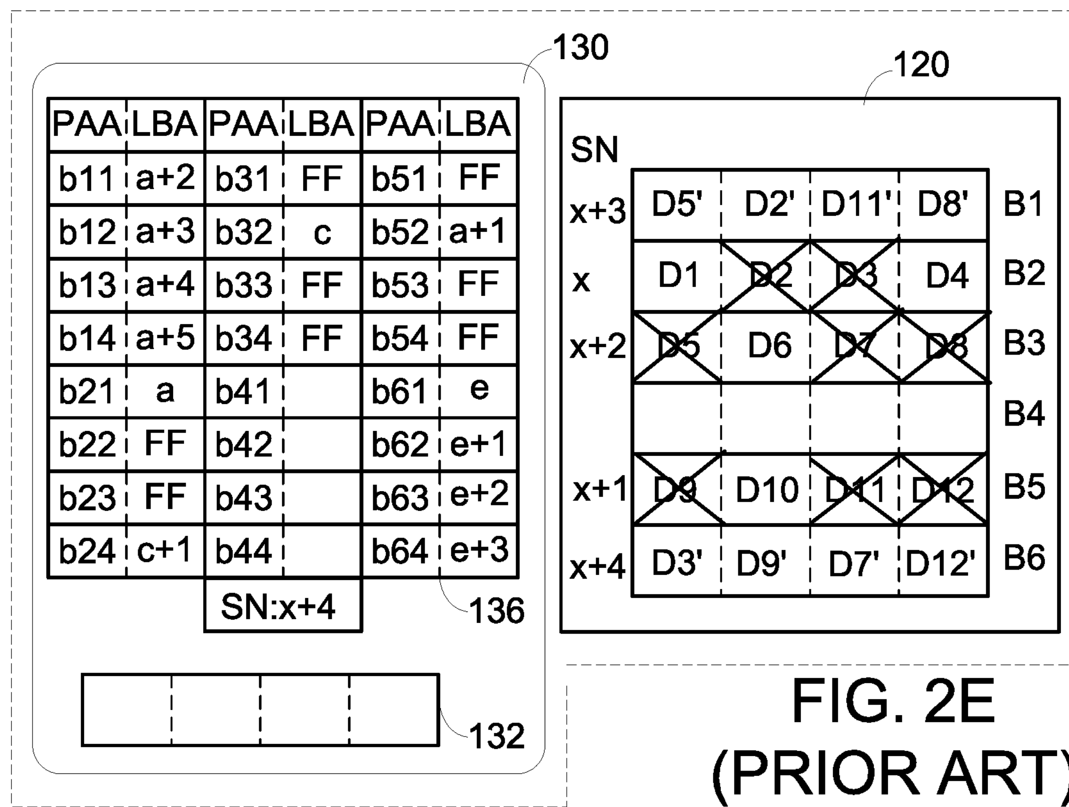
Figure 2F:
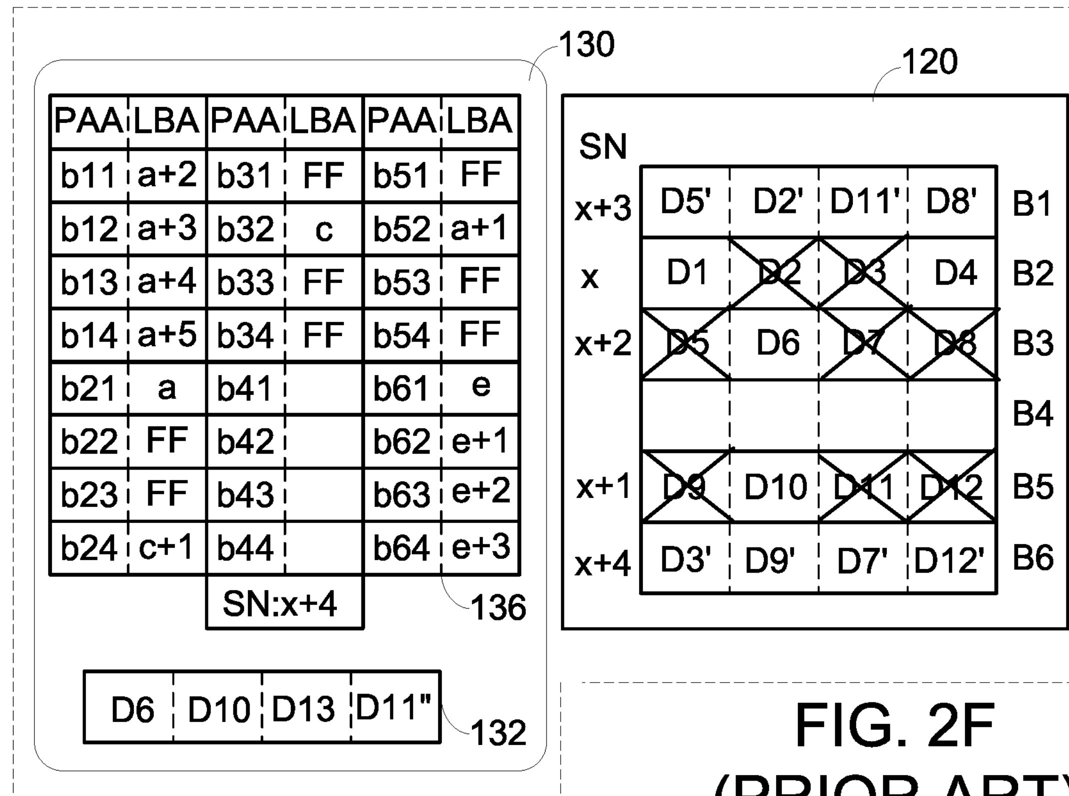
Figure 2G:
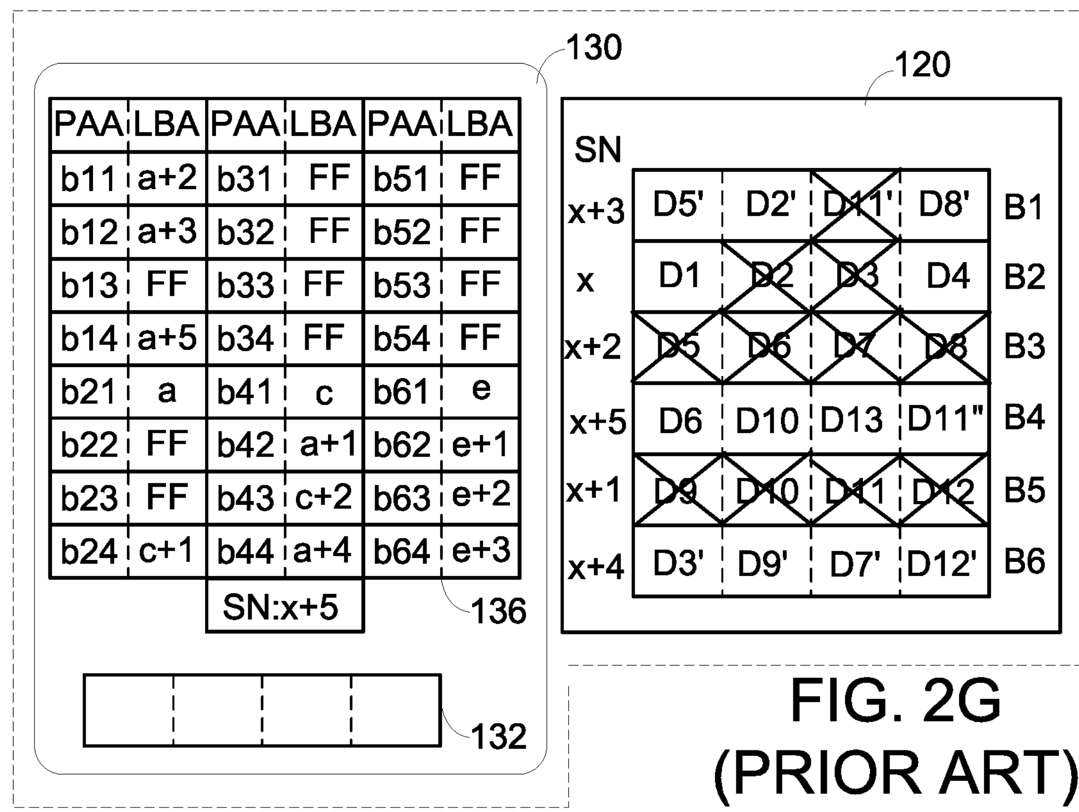
Figure 2H:
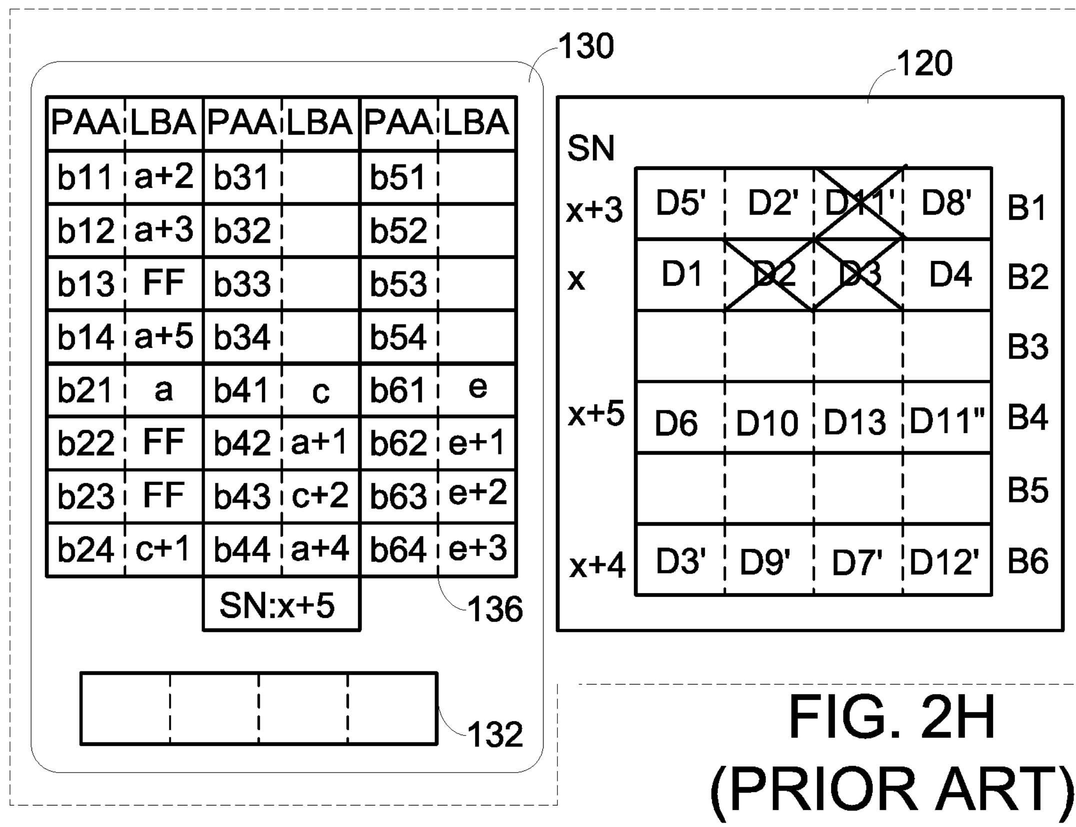
Figure 3A:
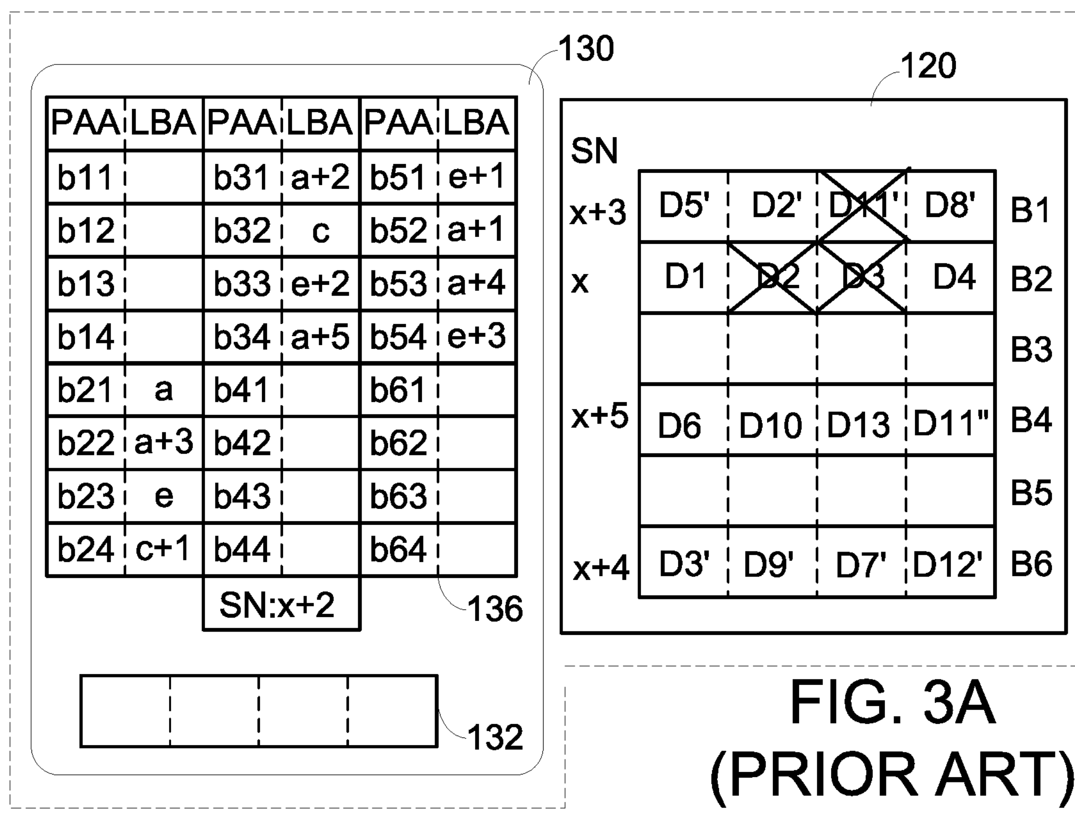
FIGS. 3A~3E (prior art) schematically illustrate a conventional method of rebuilding the FTL table of the solid state drive.
Figure 3B:
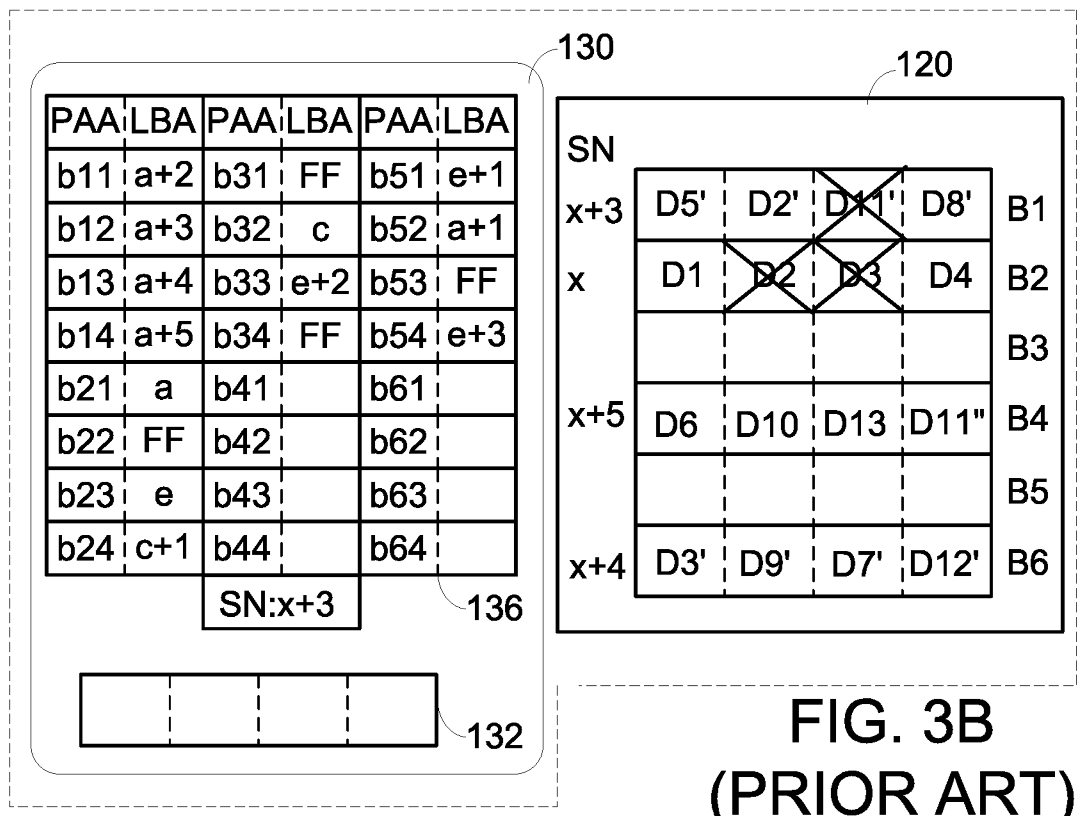
Figure 3C:
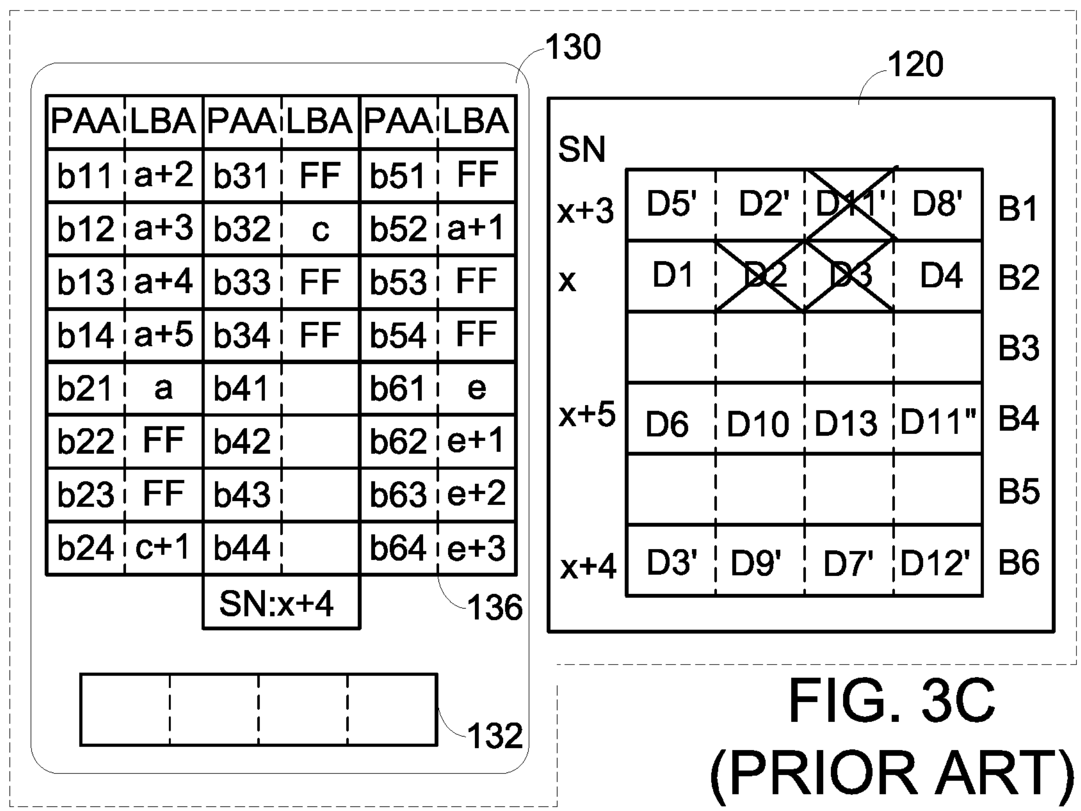
Figure 3D:
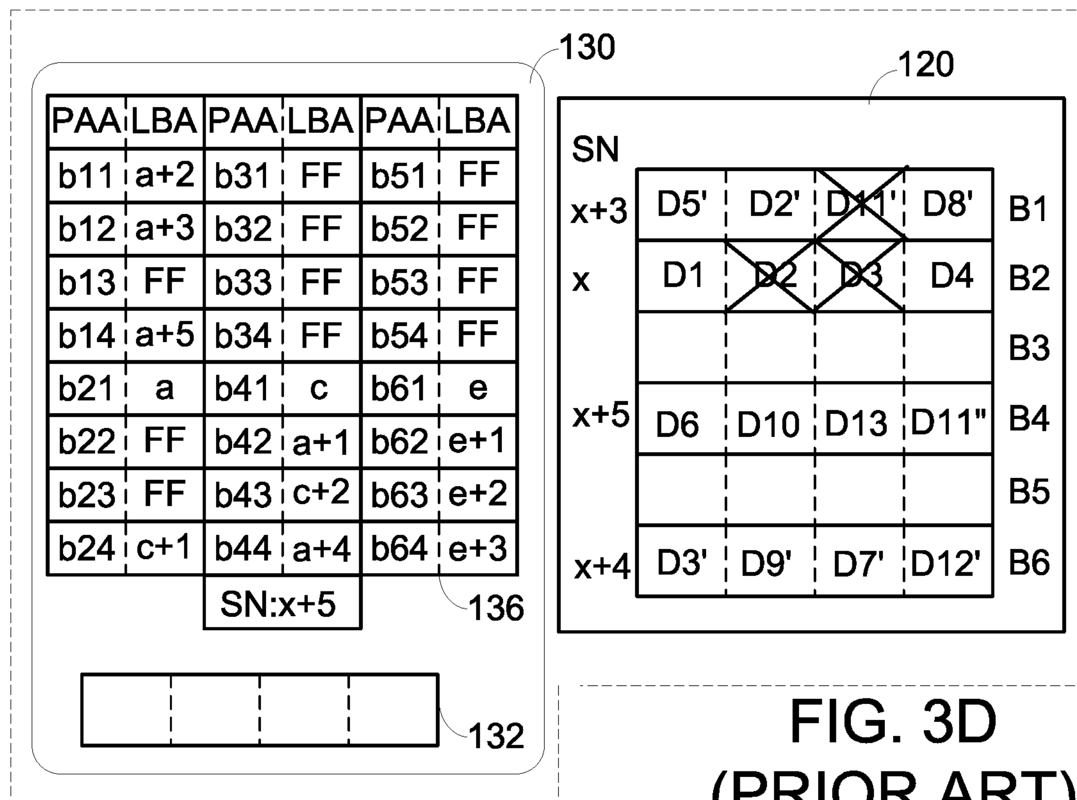
Figure 3E:
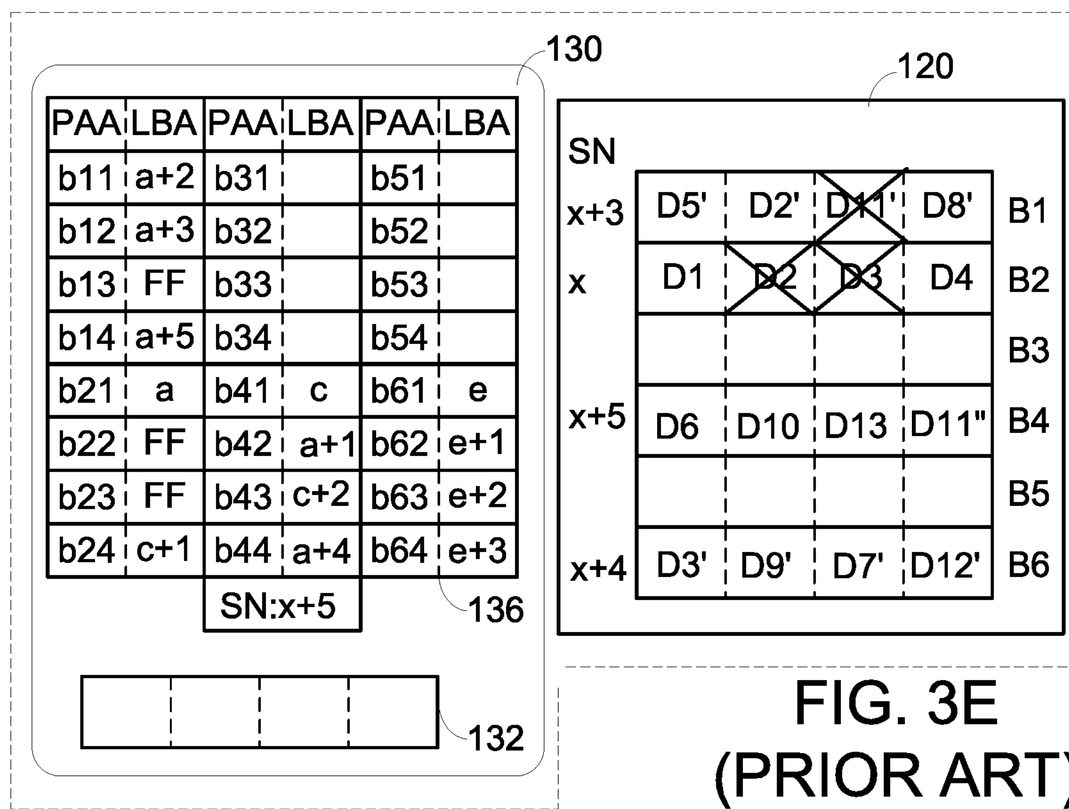
Figure 4:
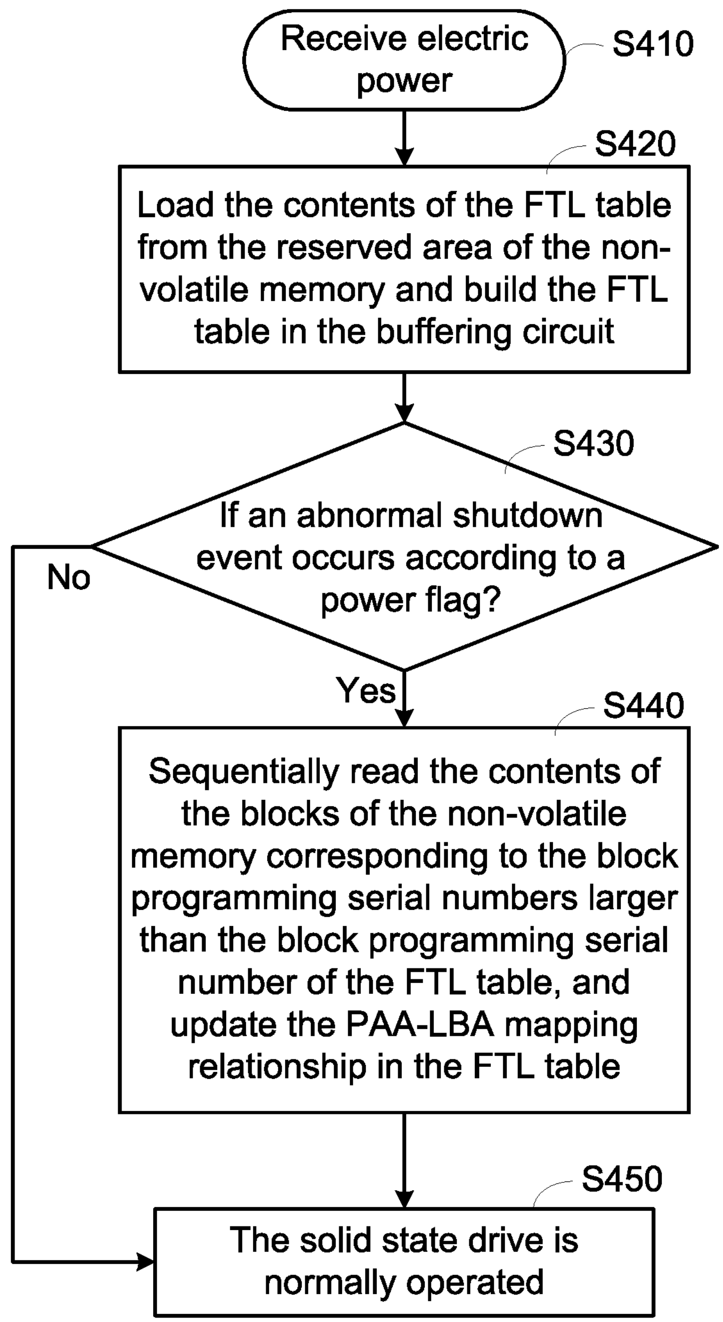
FIG. 4 (prior art) is a flowchart illustrating a conventional method of rebuilding the FTL table of the solid state drive.
Figure 5:
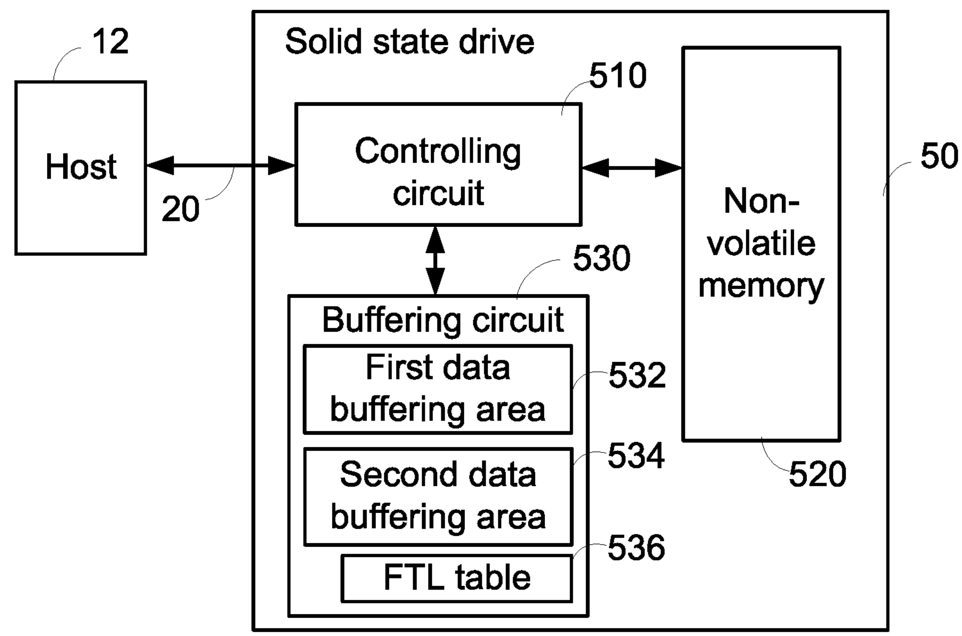
FIG. 5 is a schematic functional block diagram illustrating a solid state drive according to an embodiment of the present invention.

FIG. 5 is a schematic functional block diagram illustrating a solid state drive according to an embodiment of the present invention. As shown in FIG. 5, the solid state drive 50 comprises a controlling circuit 510, a buffering circuit 530 and a non-volatile memory 520. The controlling circuit 510 is in communication with a host 12 through an external bus 50. Consequently, commands and data can be exchanged between the controlling circuit 510 and the host 12. Generally, the external bus 20 is a USB bus, an SATA bus, a PCIe bus, or the like. For example, the buffering circuit 530 is a volatile memory such as a dynamic random access memory (DRAM).

Moreover, the storage space of the buffering circuit 530 is divided into plural storage areas. For example, the first storage area of the buffering circuit 530 is a first data buffering area 532, the second storage area of the buffering circuit 530 is a second data buffering area 534, and the third storage area of the buffering circuit 530 is used as a flash translation layer (FTL) table 536.

The write data from host 12 are temporarily stored in the first data buffering area 532. The valid data to be moved during a garbage collection of the non-volatile memory 520 are temporarily stored in the second data buffering area 534. For example, when the host 12 intends to store the write data into the non-volatile memory 520, the write data received by the controlling circuit 510 through the external bus 20 are temporarily stored into the first data buffering area 532. Moreover, while the garbage collection of the non-volatile memory 520 is performed by the controlling circuit 510, the valid data to be moved are temporarily stored into the second data buffering area 534. Moreover, the controlling circuit 510 simultaneously defines two open blocks in the non-volatile memory 520. The write data in the first data buffering area 532 and the valid data in the second data buffering area 534 are written to the corresponding open blocks of the non-volatile memory 520 at proper time.

FIGS. 6A~6H schematically illustrate the actions of the solid state drive according to the embodiment of the present invention. It is assumed that the non-volatile memory 520 has six blocks B1~B6 and each block has four storage spaces. Moreover, the terms "a", "c", "e" and "x" denote specified numbers.

Figure 6A:
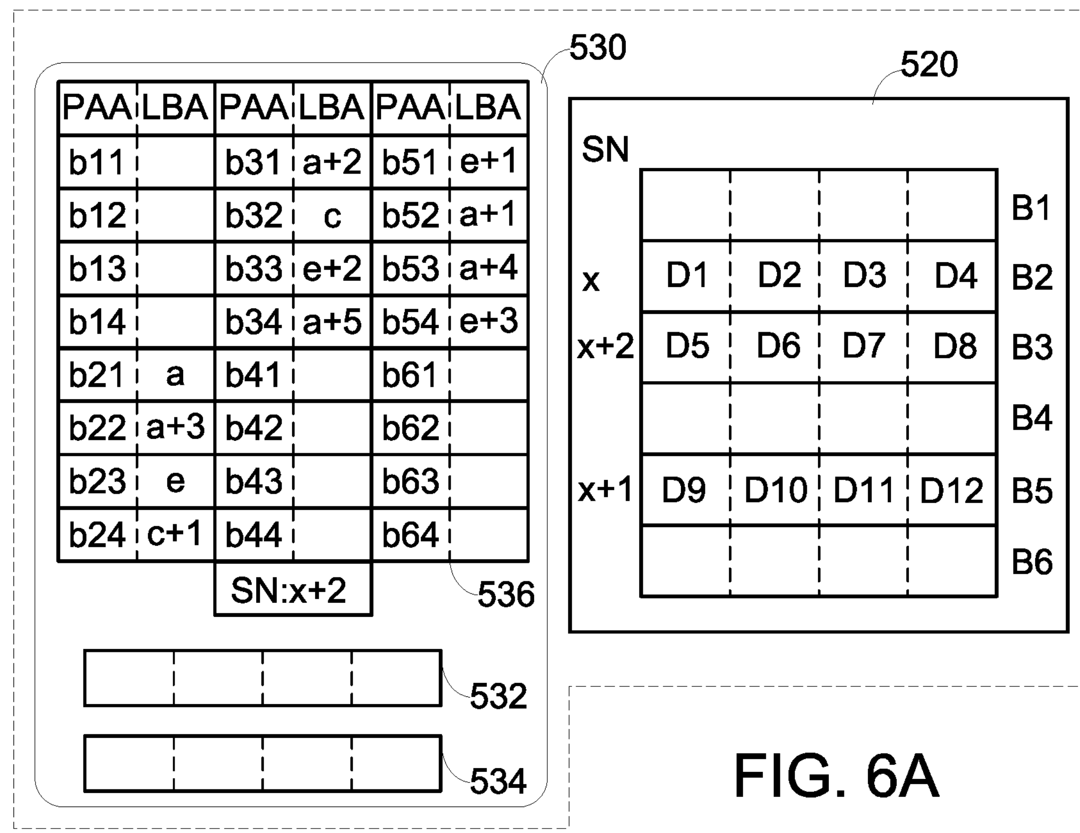
FIGS. 6A-6H schematically illustrate the actions of the solid state drive according to the embodiment of the present invention.

Firstly, please refer to FIG. 6A. When the electric power is received by the solid state drive 50, the contents of the FTL table in a reserved area of the non-volatile memory 520 are loaded into the FTL table 536 of the buffering circuit 530. If the controlling circuit 510 confirms that no abnormal shutdown event occurs, the solid state drive 50 can be normally operated.

Figure 6B:
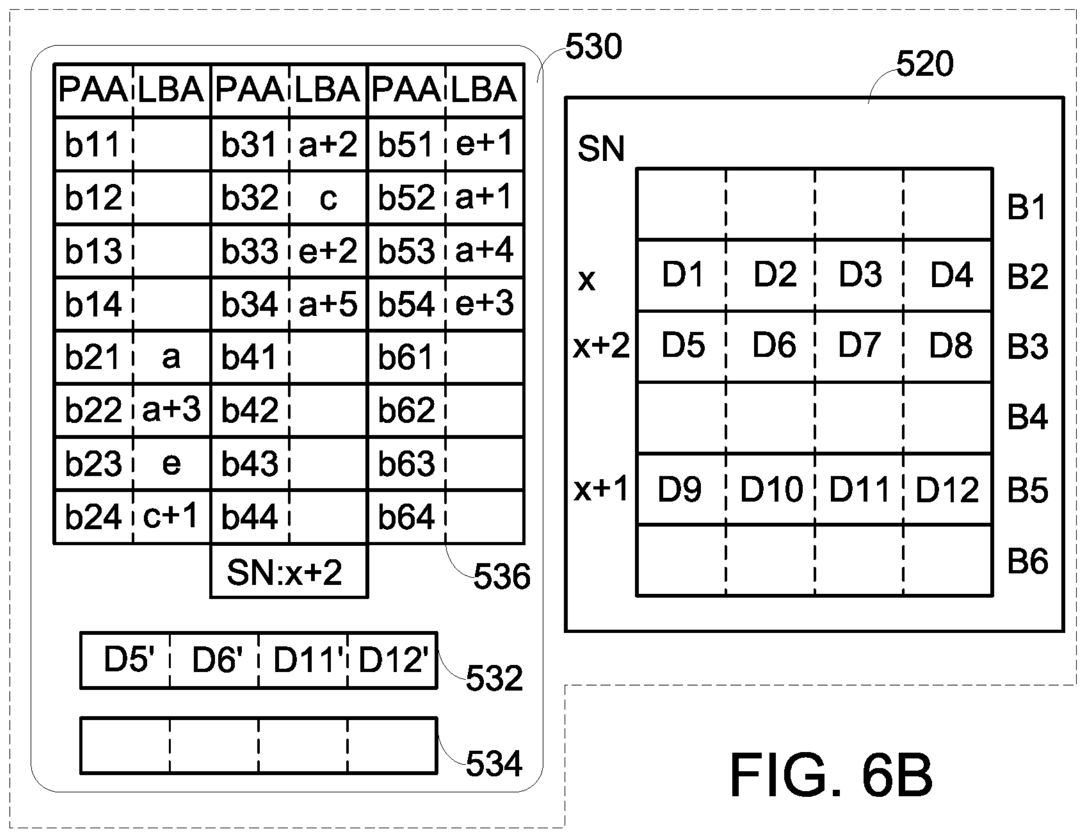

Please refer to FIG. 6B. The controlling circuit 510 receives a write command from the host 12. The write command intends to provide data D5', D6', D11' and D12' to update the data D5, D6, D11 and D12 in the LBAs (a+2), (c), (a+4) and (e+3). Meanwhile, the data D5', D6', D11' and D12' are temporarily stored in the first data buffering area 532.

Figure 6C:
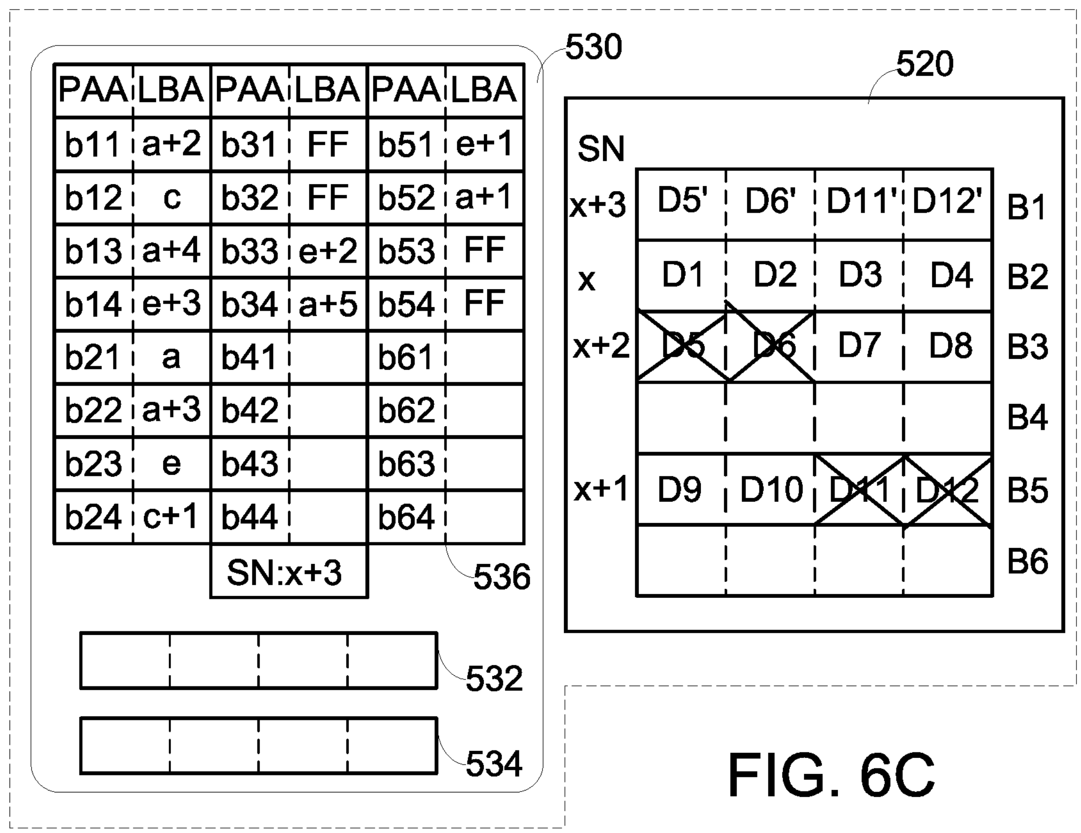

Please refer to FIG. 6C. The controlling circuit 510 selects the first block B1 as the open block, and provides the block programming serial number (x+3) to the first block B1. Moreover, the block programming serial number in the FTL table 536 is updated (i.e., SN:x+3). Then, the data D5', D6', D11' and D12' in the first data buffering area 532 are written into the four storage spaces of the open block (i.e., the first block B1) by the controlling circuit 510, and the FTL table 536 is updated.

Figure 6D:
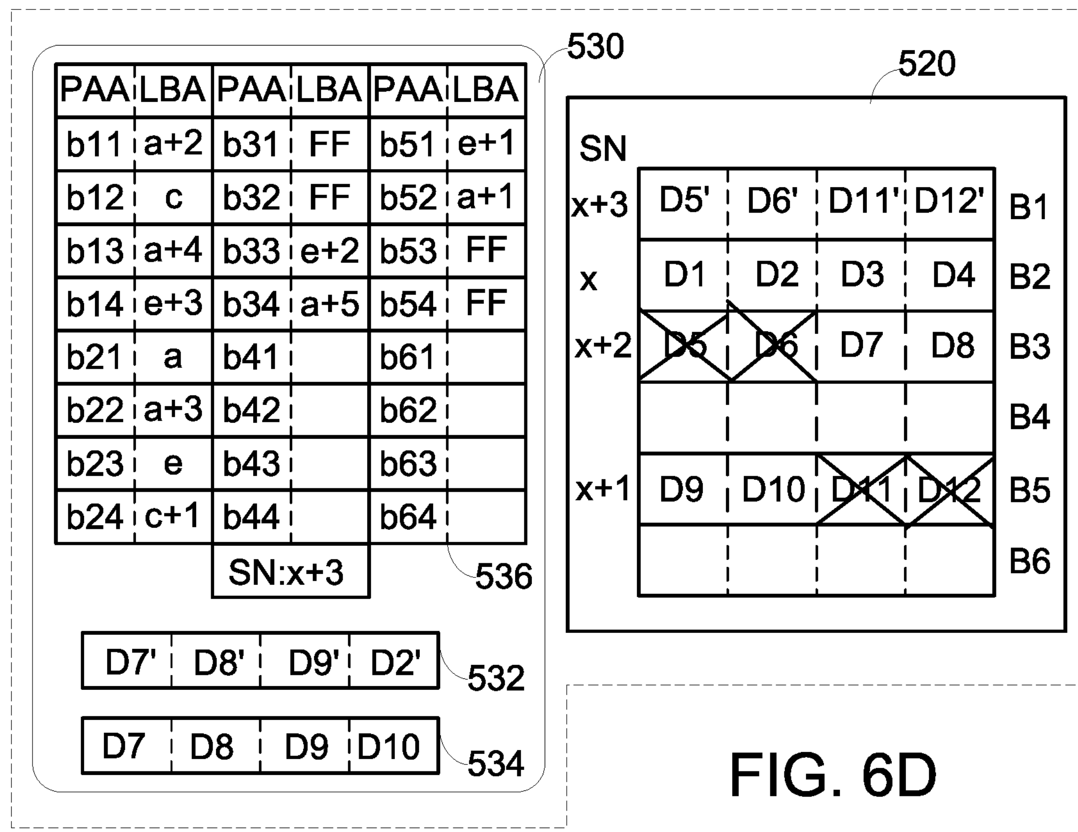

Please refer to FIG. 6D. In case that the solid state drive 50 contains a great number of invalid data, the controlling circuit 510 performs a garbage collection. Consequently, the valid data D7 and D8 in the third block B3 and the valid data D9 and D10 in the fifth block B5 are moved to the second data buffering area 534.

While the garbage collection is performed, the controlling circuit 510 can still receive the command from the host 12. As shown in FIG. 6D, the controlling circuit 510 receives a write command from the host 12. The write command intends to provide the data D7', D8', D9' and D2' to update the data D7, D8, D9 and D2 in the LBAs (e+2), (a+5), (e+1) and (a+3). In addition, the data D7', D8', D9' and D2' are temporarily stored in the first data buffering area 532. Moreover, while the garbage collection is performed, the controlling circuit 510 determines a block range to be subjected to the garbage collection according to the current block programming serial number. In particular, the block range to be subjected to the garbage collection includes the blocks with block programming serial numbers lower than the current block programming serial number.

For example, as shown in FIG. 6D, the current block programming serial number is the block programming serial number (x+3) that is recorded in the FTL table 536. According to the current block programming serial number (x+3), the controlling circuit 510 determines the block range to be subjected to the garbage collection. In particular, the block range to be subjected to the garbage collection includes the blocks with block programming serial numbers lower than the current block programming serial number (x+3). That is, the second block B2 with the block programming serial number (x), the fifth block with the block programming serial number (x+1) and the third block B3 with the block programming serial number (x+2).

After the block range for the garbage collection is determined, the controlling circuit 510 selects blocks from the block range in order to perform the garbage collection. For example, the controlling circuit 510 selects at least one of the second block B2, the fifth block B5 and the third block B3 according to the number of invalid data. Consequence, the controlling circuit 510 selects the third block B and the fifth block B5 in order to perform the garbage collection.

Figure 6E:
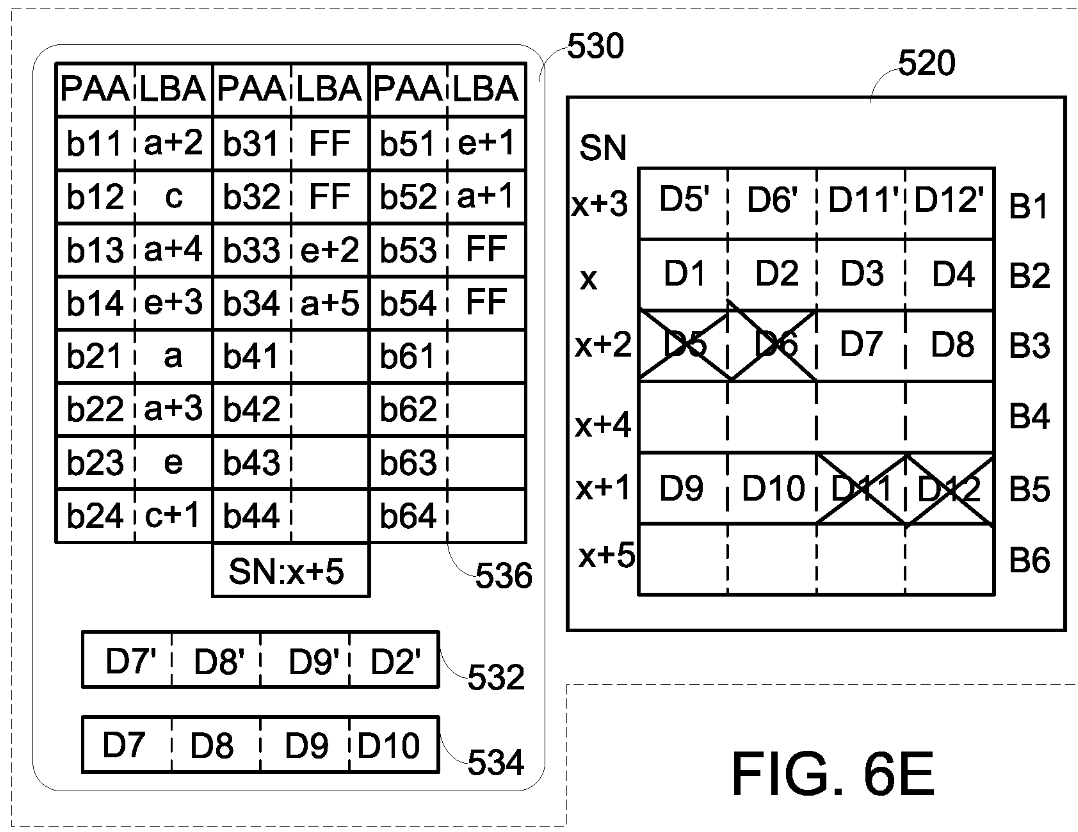

Please refer to FIG. 6E. For allowing the write data in the first data buffering area 532 and the valid data in the second data buffering area 534 to be stored into the corresponding blocks, the following procedure is performed. For example, the controlling circuit 510 selects the fourth block B4 as an open block and provides a block programming serial number (x+4) to the fourth block B4. Consequently, the write data in the first data buffering area 532 can be stored into the fourth block B4. Moreover, the controlling circuit 510 selects the sixth block B6 as another open block and provides a block programming serial number (x+5) to the sixth block B6. Consequently, the valid data in the second data buffering area 534 can be stored into the sixth block B6. Then, the FTL table 536 is updated to the block programming serial number (SN:x+5).

Moreover, if the write data from the host and the moved valid data corresponding to the garbage collection are intended to be stored into the non-volatile memory 520 at the same time, the moved valid data corresponding to the garbage collection have the priority to be stored into the non-volatile memory 520 by the controlling circuit 510. Please refer to FIG. 6F. After the block programming serial numbers are provided to the open block for storing the write data (i.e., the fourth block B4) and the open block for storing the moved valid data (i.e., the sixth block B6), the controlling circuit 510 writes the D7, D8, D9 and D10 from the second data buffering area 534 to the four storage spaces of the sixth block B6 and updates the FTL table 536.

Figure 6F:
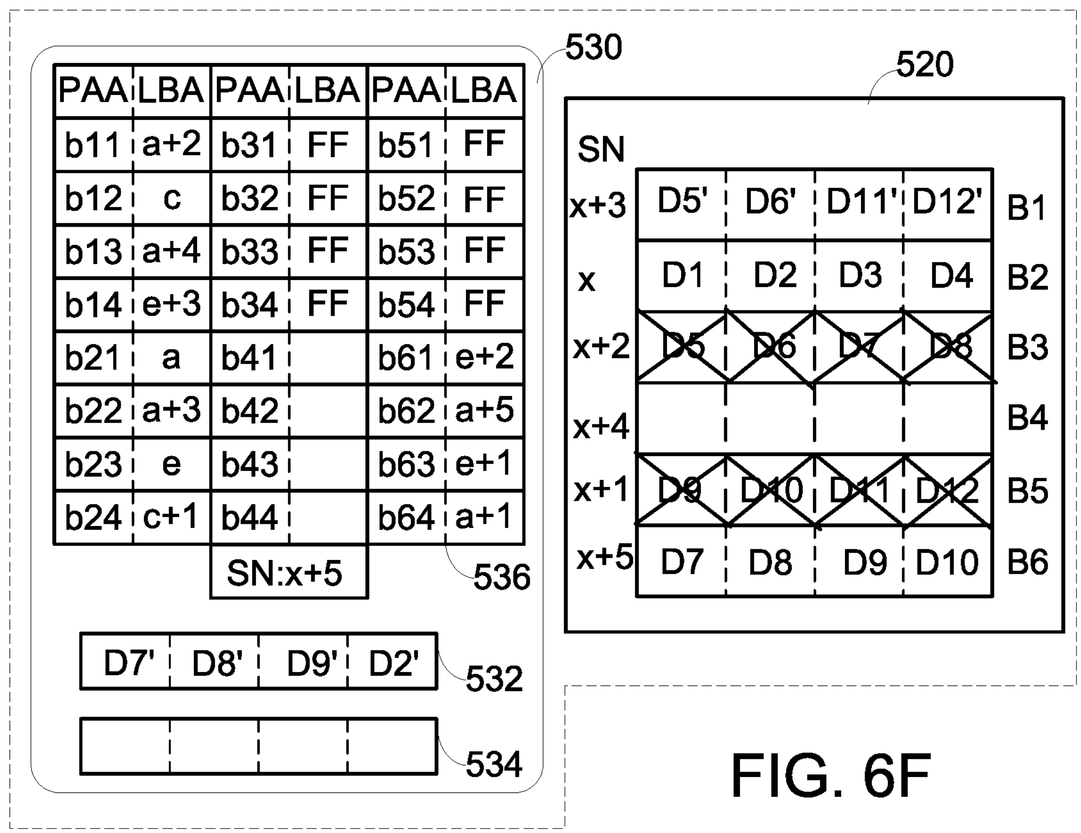

Please refer to FIG. 6F again. Since the D7, D8, D9 and D10 are stored into the sixth block B6 (i.e., the open block), the PAAs (b61)~(b64) in the FTL table 536 are mapped to the LBAs (e+2), (a+5), (e+1) and (a+1), respectively. Moreover, after the PAAs (b33), (b34), (b51) and (b52) corresponding to the LBAs (e+2), (a+5), (e+1) and (a+1) are updated, the PAAs (b33), (b34), (b51) and (b52) are mapped to the invalid LBA (FF). In the FTL table 536 as shown in FIG. 6F, the data in the storage spaces corresponding to the PAAs (b33), (b34), (b51) and (b52) are invalid data.

Figure 6G:
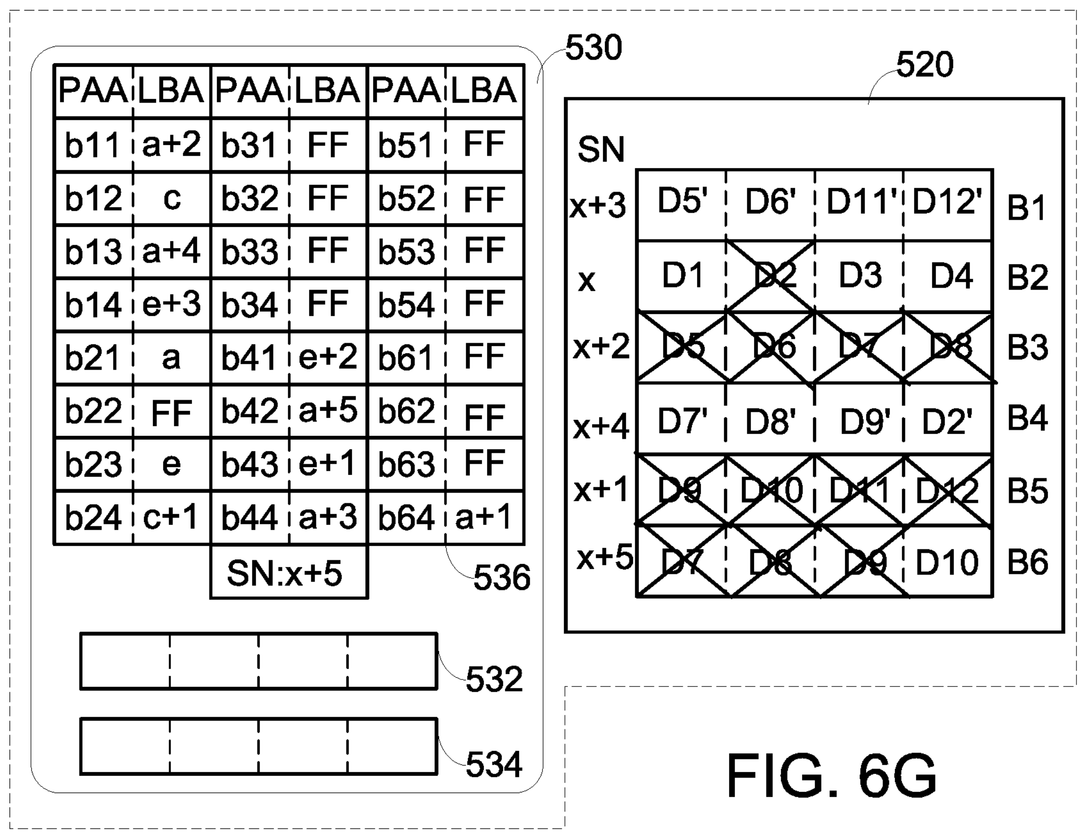

Then, as shown in FIG. 6G, the controlling circuit 510 writes the data D7', D8', D9' and D2' from the first data buffering area 532 to the four storage spaces of the fourth block B4 and updates the FTL table 536. Since the D7', D8', D9' and D2' are stored into the fourth block B4 (i.e., the open block), the PAAs (b41)~(b44) in the FTL table 536 are mapped to the LBAs (e+2), (a+5), (e+1) and (a+3), respectively. Moreover, the PAAs (b61), (b62), (b63) and (b22) that store the old data D7, D8, D9 and D2 are mapped to the invalid LBA (FF). In the FTL table 536 as shown in FIG. 6G, the data in the storage spaces corresponding to the PAAs (b61), (b62), (b63) and (b22) are invalid data.

Figure 6H:
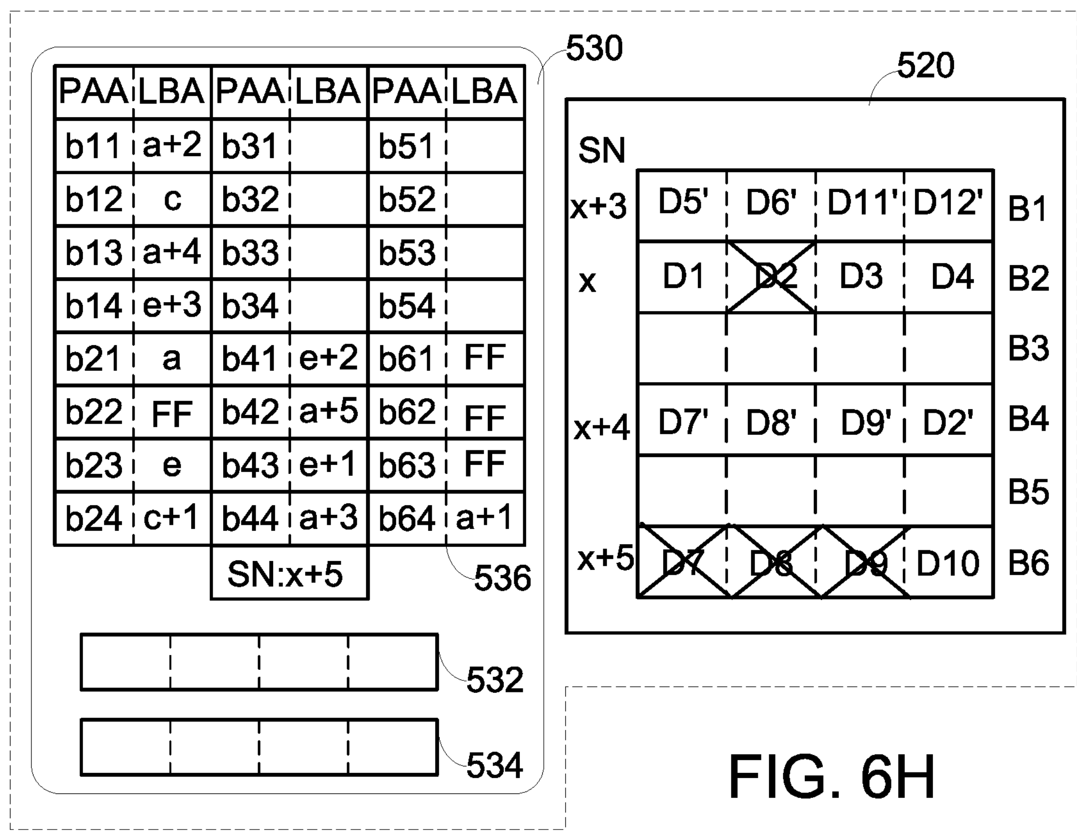

Please refer to FIG. 6H. The data in the storage spaces of the third block B3 and the fifth block B5 are all invalid data.

Consequently, after the garbage collection is completed, the third block B3 and the fifth block B5 are erased as the blank blocks by the controlling circuit 510. Moreover, the block programming serial numbers (x+2) and (x+1) are also erased. Moreover, after the FTL table 536 is updated, the PAAs (b31)~(b34) and (b51)~(b54) have no mapping relationship to the LBAs. According to the contents of the FTL table 536, the third block B3 and the fifth block B5 become the blank blocks.

It is noted that numerous modifications and alterations may be made while retaining the teachings of the invention. Please refer to the situation of FIG. 6F again. In another embodiment, after the third block B3 and the fifth block B5 are erased as the blank blocks by the controlling circuit 510, the garbage collection is completed. Then, the write data in the first data buffering area 532 are stored into the non-volatile memory 520. Consequently, the result as shown in FIG. 6H is also acquired.

From the above descriptions in FIGS. 6A~6H, the present invention provides the flash translation layer table rebuilding method for the solid state drive. If the controlling circuit 510 is shut down according to a shutdown command from the host 12, the contents of the FTL table in the non-volatile memory 520 are loaded into the FTL table 536 of the buffering circuit 530 by the controlling circuit 510 after the solid state drive 50 is powered again. Consequently, the solid state drive 50 can be normally operated.

As mentioned above, the buffering circuit 530 of the solid state drive 50 uses the first data buffering area 532 and the second data buffering area 534 to temporarily store the data from different sources. Moreover, the non-volatile memory 52 is equipped with plural open blocks for storing the data corresponding to the data buffering areas. In case that the solid state drive 50 is suffered from an abnormal shutdown event, the conventional method of rebuilding the FTL table may result in a data loss problem. The reasons will be described by referring to FIG. 6H.

In accordance with the conventional method of rebuilding the FTL table, the controlling circuit sequentially reads the contents of the blocks according to the block programming serial numbers of the non-volatile memory in order to update the PAA-LBA mapping relationship in the FTL table. Obviously, as shown in FIG. 6H, the sixth block B6 has the largest block programming serial number (x+5). If the conventional FTL rebuilding method is adopted, the valid data D7', D8' and D9' are respectively replaced by the invalid data D7, D8 and D9. Under this circumstance, erroneous data are generated.

In accordance with the present invention, the valid data to be moved during the garbage collection of the non-volatile memory 520 are stored in the second data buffering area 534. While the data in the second data buffering area 534 are written into the non-volatile memory 520, the controlling circuit 501 not only provides the block programming serial number to the open block but also provides an auxiliary serial number to the open block.

Figure 7A:
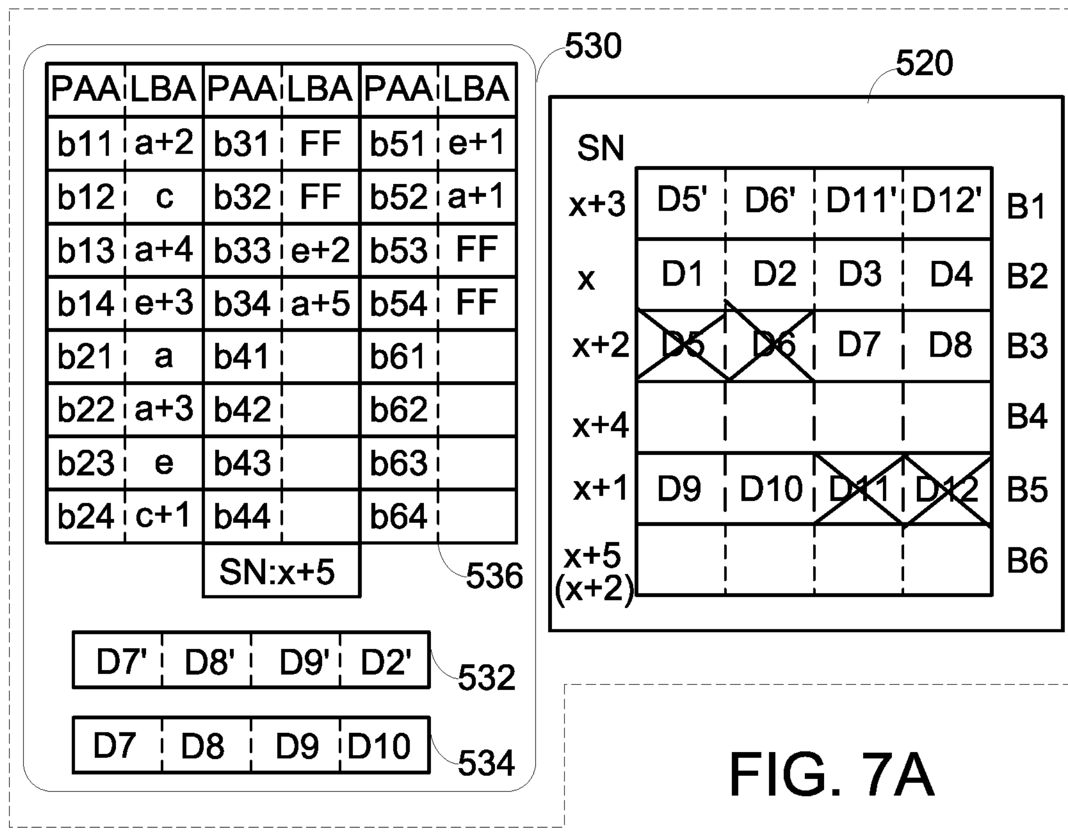
FIGS. 7A and 7B schematically illustrate the actions of the solid state drive according to the embodiment of the present invention, in which an auxiliary serial number is provided to the open block.
Figure 7B:
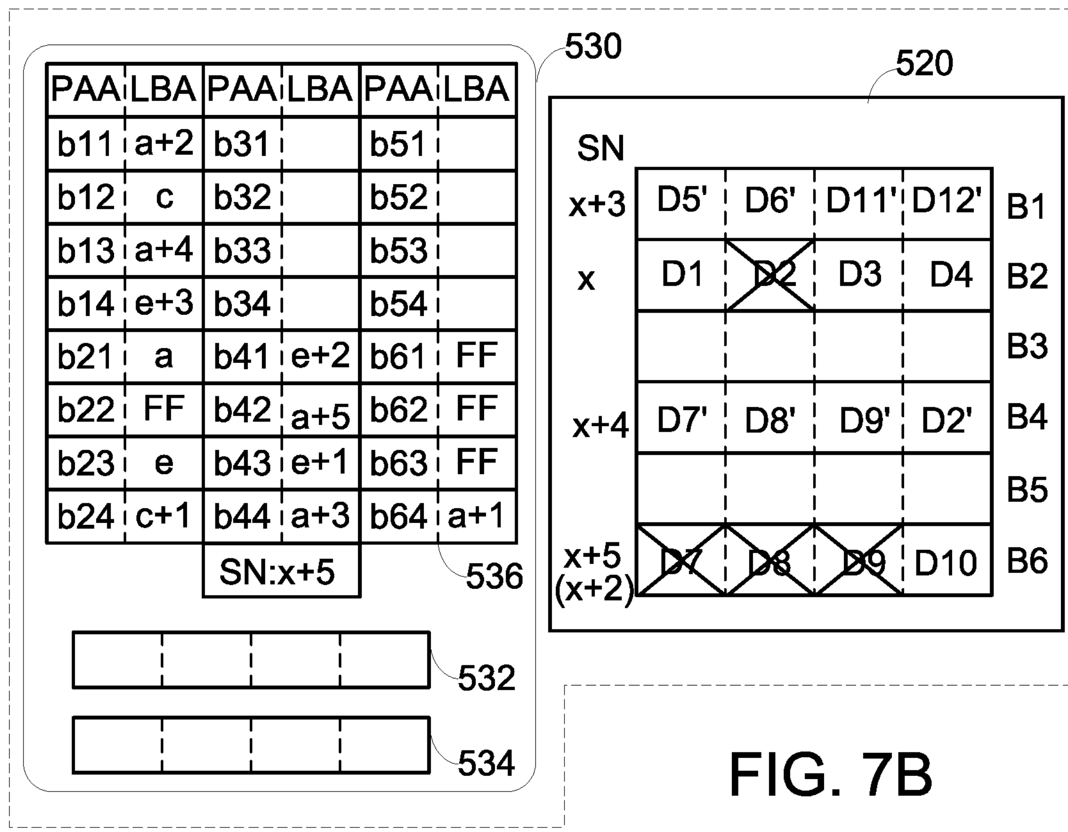

For example, in the situation of FIG. 6E, the controlling circuit 510 selects the sixth block B5 as the open block and provides the block programming serial number (x+5) to the open block (i.e., the sixth block B6) in order to store the valid data of the second data buffering area 534. In accordance with the present invention, the controlling circuit 501 not only provides the block programming serial number (x+5) to the open block (i.e., the sixth block B6) but also provides an auxiliary serial number (x+2) to the open block (i.e., the sixth block B6). FIGS. 7A and 7B schematically illustrate the actions of the solid state drive according to the embodiment of the present invention, in which an auxiliary serial number is provided to the open block. After the structure of FIG. 6E is modified to the structure of FIG. 7A, the sixth block B6 has the block programming serial number (x+5) and the auxiliary serial number (x+2).

The valid data D7, D8, D9 and D10 are collected from the third block B3 and the fifth block B5 during the garbage collection. The third block B3 and the fifth block B5 correspond to the block programming serial numbers (x+2) and (x+1), respectively. In the embodiment of the present invention, among the plural blocks processed in the garbage collection, the block with the largest block programming serial number is set as the auxiliary serial number by the controlling circuit 510.

Please refer to FIG. 7A again. Similarly, the data in the second data buffering area 534 and the first data buffering area 532 are sequentially written into the two open blocks (i.e., the sixth block B6 and the fourth block B4). Then, the third block B3 and the fifth block B5 are erased as the blank blocks by the controlling circuit 510. Meanwhile, the contents of the FTL table 536 and the non-volatile memory 520 can be seen in FIG. 7B.

Figure 8:
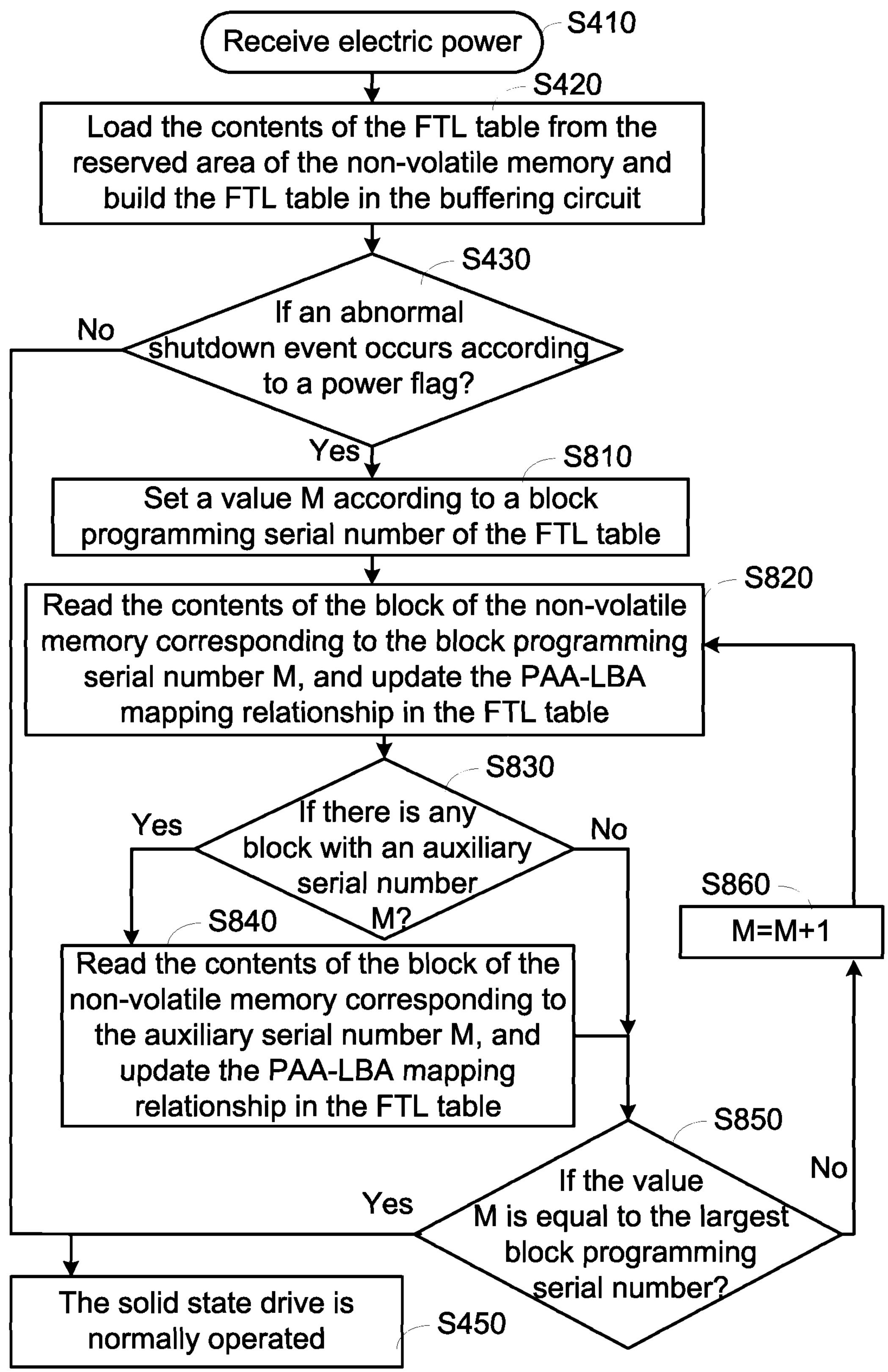
FIG. 8 is a flowchart illustrating a method of rebuilding the FTL table of the solid state drive according to an embodiment of the present invention.

FIG. 8 is a flowchart illustrating a method of rebuilding the FTL table of the solid state drive according to an embodiment of the present invention. After the solid state drive 50 receives electric power (Step S410), the controlling circuit 510 loads the contents of the FTL table from the reserved area of the non-volatile memory 520 and builds the FTL table 536 in the buffering circuit 530 (Step S420). Then, the controlling circuit 510 judges whether an abnormal shutdown event occurs according to a power flag (Step S430). If no abnormal shutdown event occurs, the solid state drive 50 is normally operated (Step S450).

Whereas, if the abnormal shutdown event occurs, a value M is set according to a block programming serial number of the FTL table (Step S810). Then, the contents of the block of the non-volatile memory 520 corresponding to the block programming serial number M are read, and the PAA-LBA mapping relationship in the FTL table is updated (Step S820).

Besides, the controlling circuit 510 judges whether there is any block of the non-volatile memory 520 with an auxiliary serial number M (Step S830). If there is one block of the non-volatile memory 520 with the auxiliary serial number M, the contents of the block of the non-volatile memory 520 corresponding to the auxiliary serial number M are read, and the PAA-LBA mapping relationship in the FTL table is updated (Step S840). After the step S840, a step S850 is performed. Whereas, if none of the blocks of the non-volatile memory 520 have the auxiliary serial number M, the step S850 is performed.

In the step S850, the controlling circuit 510 judges whether the value M is equal to the largest block programming serial number of the non-volatile memory 520. If the value M is equal to the largest block programming serial number of the non-volatile memory 520, it means that the FTL table is completely rebuilt. Then, the step S450 is performed. Whereas, if the value M is not equal to the largest block programming serial number of the non-volatile memory 520, it means that the FTL table is not completely rebuilt. Then, the value M is added by 1 (Step S860), and the step S820 is repeatedly done.

In the step S820, if the block of the non-volatile memory 520 corresponding to the block programming serial number M does not exist or the block corresponding to the block programming serial number M has been read, the step S830 is directly performed. Moreover, if a block has both of the block programming serial number and an auxiliary serial number, the auxiliary serial number is smaller than the block programming serial number. Consequently, the block has the priority to be read according to the auxiliary serial number, and then the PAA-LBA mapping relationship in the FTL table is updated.

A method of rebuilding the contents of the FTL table 536 after the solid state drive 50 in the situation of FIG. 7B is suffered from abnormal shutdown will be described as follows.

FIGS. 9A~9F schematically illustrate a method of rebuilding the FTL table of the solid state drive according to an embodiment of the present invention. In case that the solid state drive 50 is powered again after the abnormal shutdown, the contents of the FTL table 536 corresponding to the previous abnormal shutdown are not reserved in the reserved area of the non-volatile memory 520.

Figure 9A:
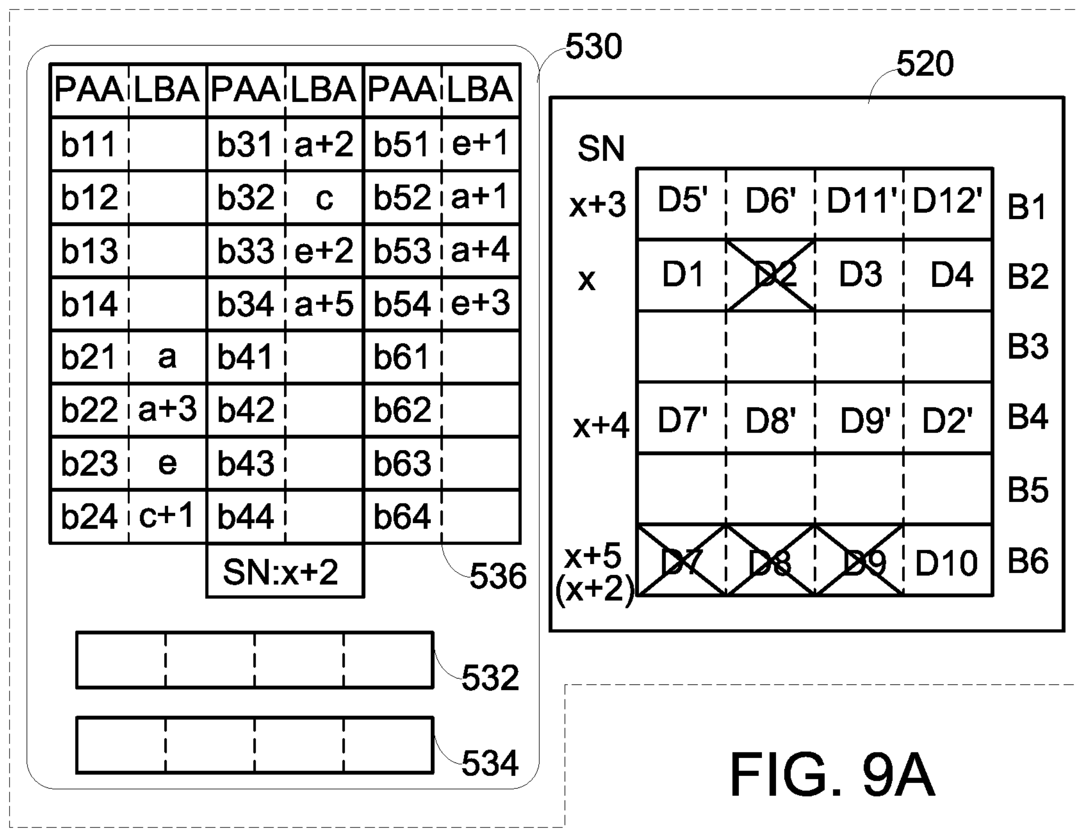
FIGS. 9A~9F schematically illustrate a method of rebuilding the FTL table of the solid state drive according to an embodiment of the present invention.

Please refer to FIG. 9A. The contents of the non-volatile memory 520 are identical to those of the non-volatile memory 520 as shown in FIG. 7B. Moreover, the contents of the FTL table 536 are identical to the contents of the FTL table 536 as shown in FIG. 6A. Moreover, the controlling circuit 510 realizes that the previous power interruption is resulted from an abnormal shutdown according to a power flag. Consequently, it is necessary to rebuild the FTL table.

As shown in FIG. 9A, the controlling circuit 510 realizes that only the FTL table 536 corresponding to the block programming serial number (x+2) is updated according to the block programming serial number (i.e., SN:x+2) recorded in the FTL table 536. Under this circumstance, the controlling circuit 510 set the value M as (x+2). Consequently, it is necessary to sequentially update the FTL table 536 from the block programming serial number (x+2) to the largest block programming serial number of the non-volatile memory 520.

Figure 9B:
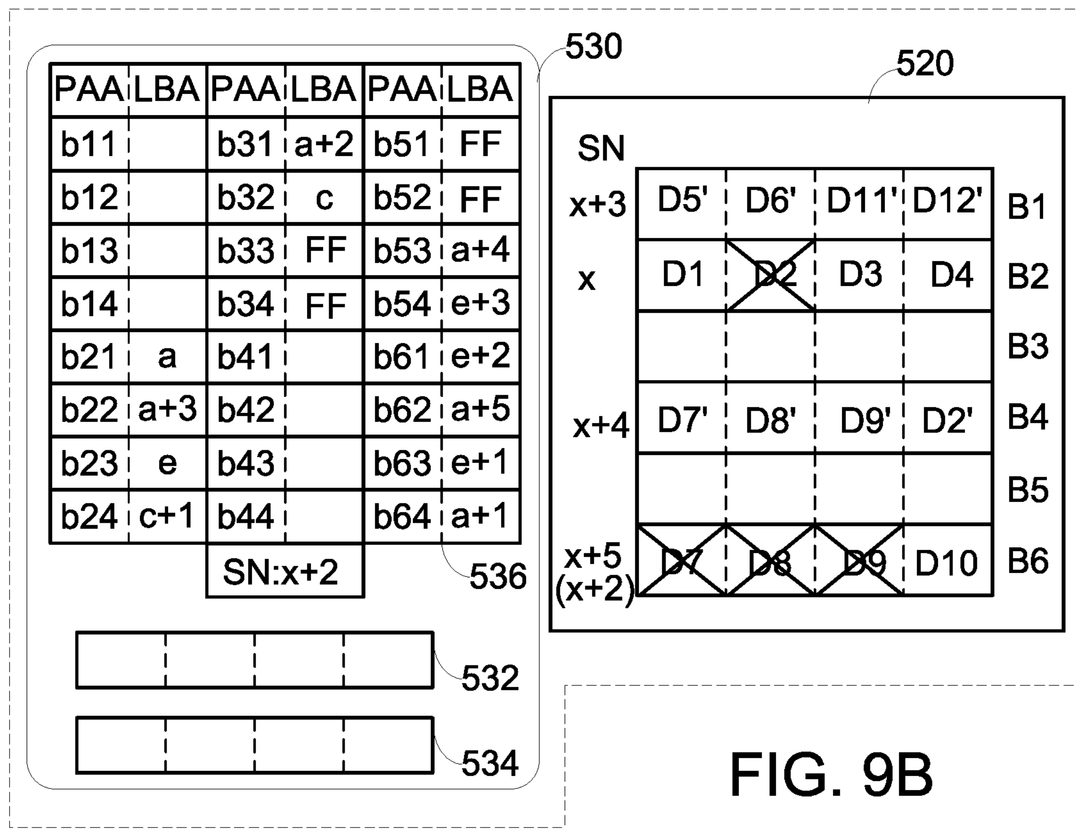

Please refer to FIG. 9B. Since the non-volatile memory 520 has no block corresponding to the block programming serial number (x+2), it is not necessary to perform the block reading action. However, since the sixth block B6 has the auxiliary serial number (x+2), the controlling circuit 501 reads the contents of the sixth block B6 and updates the PAA-LBA mapping relationship in the FTL table 536.

After the contents of the sixth block B6 are read, the controlling circuit 510 derives that the data D7, D8, D9 and D10 in the four storage spaces of the sixth block B6 correspond to the LBAs (e+2), (a+5), (e+1) and (a+1), respectively. Consequently, the controlling circuit 510 updates the FTL table 536. That is, the PAA (b61) corresponds to the LBA (e+2), the PAA (b62) corresponds to the LBA (e+5), the PAA (b63) corresponds to the LBA (e+1), and the PAA (b64) corresponds to the LBA (a+1).

Moreover, after the PAA (b33) corresponding to the LBA (e+2) is updated, the PAA (b33) corresponds to the invalid LBA (FF). After the PAA (b34) corresponding to the LBA (a+5) is updated, the PAA (b34) corresponds to the invalid LBA (FF). After the PAA (b51) corresponding to the LBA (e+1) is updated, the PAA (b51) corresponds to the invalid LBA (FF). After the PAA (b52) corresponding to the LBA (a+1) is updated, the PAA (b52) corresponds to the invalid LBA (FF).

Figure 9C:
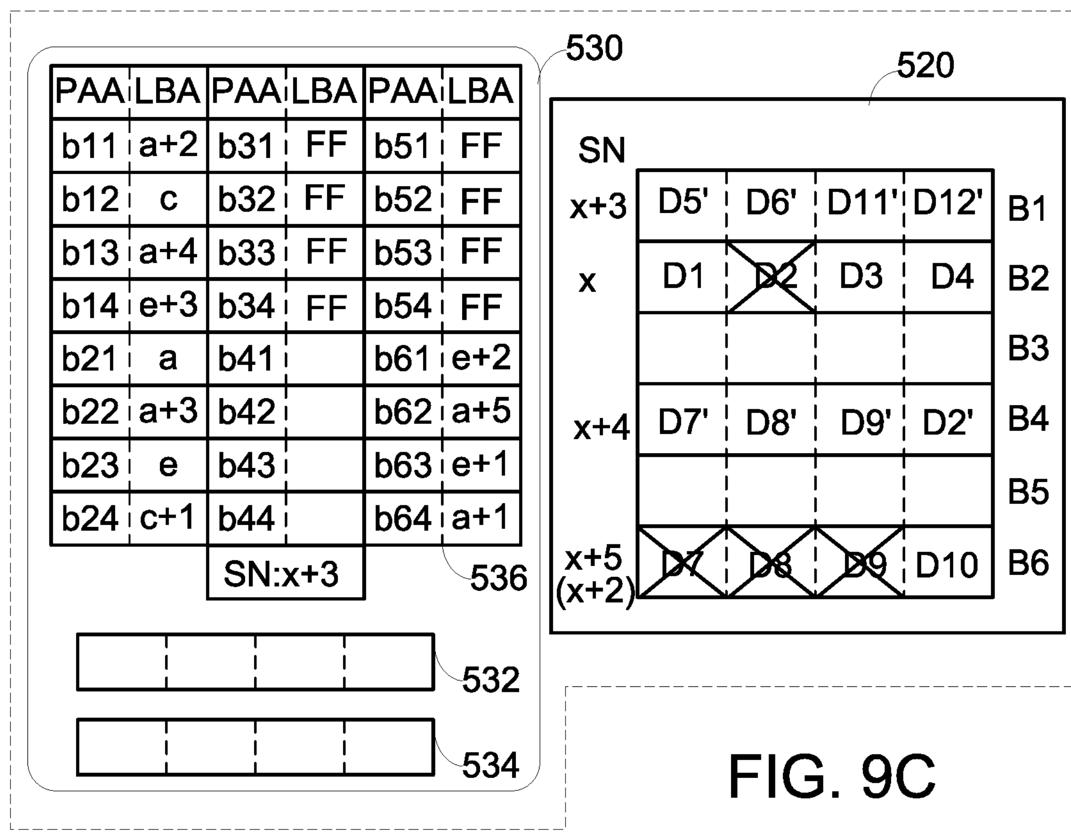

Please refer to FIG. 9C. The controlling circuit 510 updates the FTL table 536 to the block programming serial number (SN:x+3), and reads the contents of the first block B1 corresponding to the block programming serial number (x+3). In this embodiment, the data D5', D6', D11' and D12' in the four storage spaces of the first block B1 correspond to the LBAs (a+2), (c), (a+4) and (e+3), respectively.

Consequently, the controlling circuit 510 updates the FTL table 536. That is, the PAA (b11) corresponds to the LBA (a+2), the PAA (b12) corresponds to the LBA (c), the PAA (b13) corresponds to the LBA (a+4), and the PAA (b14) corresponds to the LBA (e+3). Moreover, after the PAA (b31) corresponding to the LBA (e+2) is updated, the PAA (b31) corresponds to the invalid LBA (FF). After the PAA (b32) corresponding to the LBA (c) is updated, the PAA (b32) corresponds to the invalid LBA (FF). After the PAA (b53) corresponding to the LBA (a+4) is updated, the PAA (b53) corresponds to the invalid LBA (FF). After the PAA (b54) corresponding to the LBA (e+3) is updated, the PAA (b54) corresponds to the invalid LBA (FF). Since the non-volatile memory 520 has no block corresponding to the auxiliary serial number (x+3), it is not necessary to perform the block reading action.

Figure 9D:
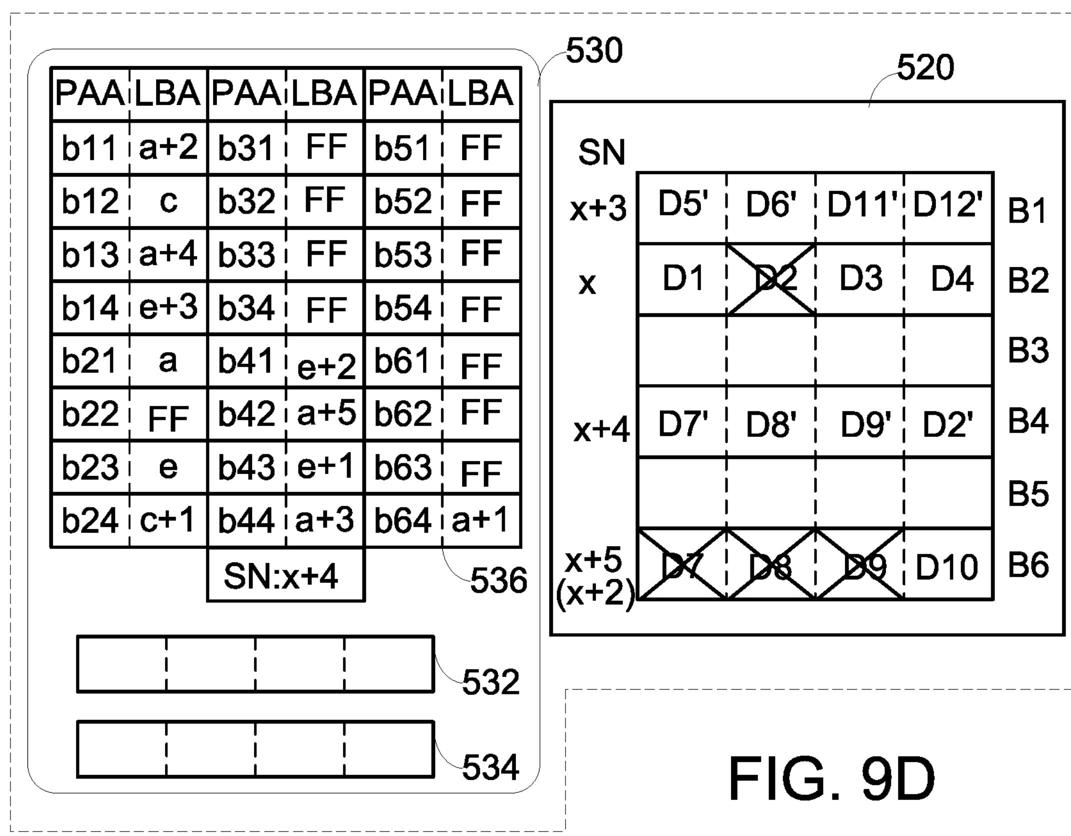

Please refer to FIG. 9D. The controlling circuit 510 sets the value M as (x+4). In addition, the controlling circuit 510 updates the FTL table 536 to the block programming serial number (SN:x+4), and reads the contents of the fourth block B4 corresponding to the block programming serial number (x+4). In this embodiment, the data D7', D8', D9' and D2' in the four storage spaces of the fourth block B4 correspond to the LBAs (e+2), (a+5), (e+1) and (a+3), respectively.

Consequently, the controlling circuit 510 updates the FTL table 536. That is, the PAA (b41) corresponds to the LBA (e+2), the PAA (b42) corresponds to the LBA (a+5), the PAA (b43) corresponds to the LBA (e+1), and the PAA (b44) corresponds to the LBA (a+3). Moreover, after the PAA (b61) corresponding to the LBA (e+2) is updated, the PAA (b61) corresponds to the invalid LBA (FF). After the PAA (b62) corresponding to the LBA (a+5) is updated, the PAA (b62) corresponds to the invalid LBA (FF). After the PAA (b63) corresponding to the LBA (e+1) is updated, the PAA (b63) corresponds to the invalid LBA (FF). After the PAA (b22) corresponding to the LBA (a+3) is updated, the PAA (b22) corresponds to the invalid LBA (FF). Since the non-volatile memory 520 has no block corresponding to the auxiliary serial number (x+4), it is not necessary to perform the block reading action.

Figure 9E:
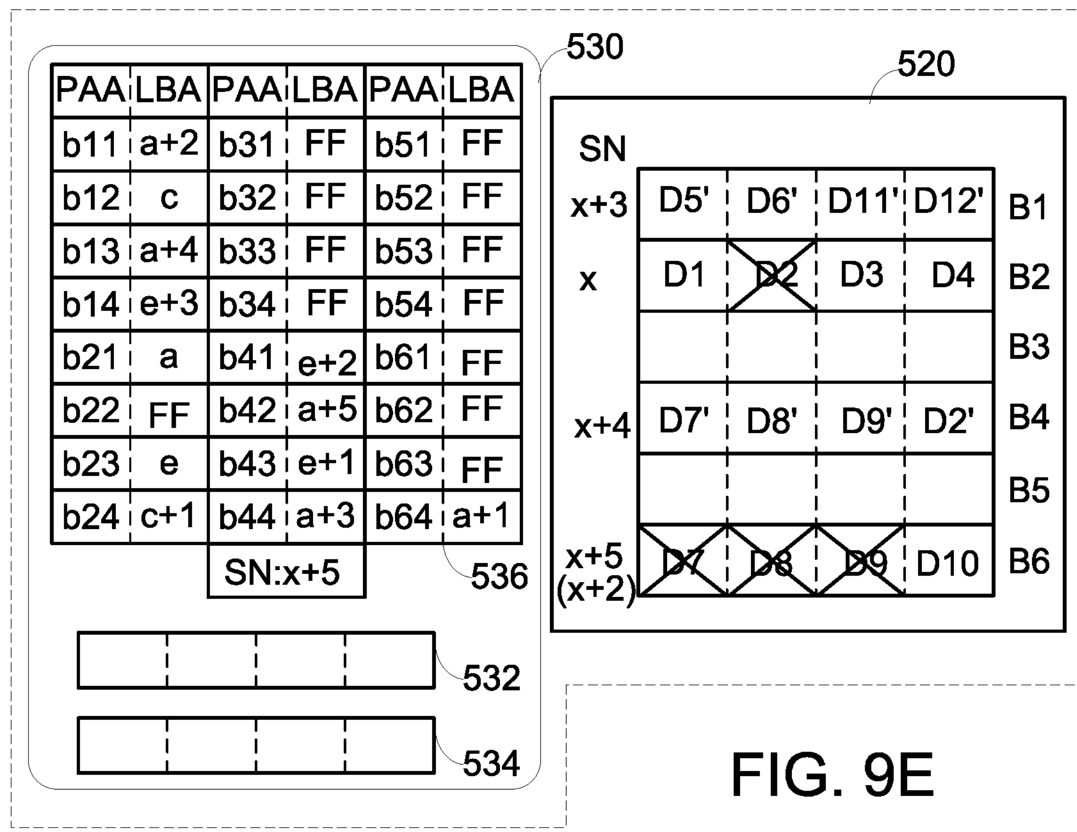

Please refer to FIG. 9E. The controlling circuit 510 sets the value M as (x+5). In addition, the controlling circuit 510 updates the FTL table 536 to the block programming serial number (SN:x+5). Since the sixth block B6 corresponding to the block programming serial number (SN:x+5) also has the auxiliary serial number (x+2), the contents of the sixth block B6 have been read. In other words, it is not necessary to read the contents of the sixth block B6. Since the non-volatile memory 520 has no block corresponding to the auxiliary serial number (x+5), it is not necessary to perform the block reading action.

Moreover, since the largest block programming serial number of the non-volatile memory 520 is (x+5), the non-volatile memory 520 is no longer read by the controlling circuit 510. Meanwhile, the controlling circuit 510 arranges the contents of the FTL table 536. Since all of the PAAs (b31)~(b34) and (b51)~(b54) correspond to the invalid LBA (FF), the controlling circuit 510 confirms that the third block B3 and the fifth block B5 are blank blocks. After the FTL table 536 is updated, the PAAs (b31)~(b34) and (b51)~(b54) have no mapping relationship to the LBAs (see FIG. 9F).

Figure 9F:
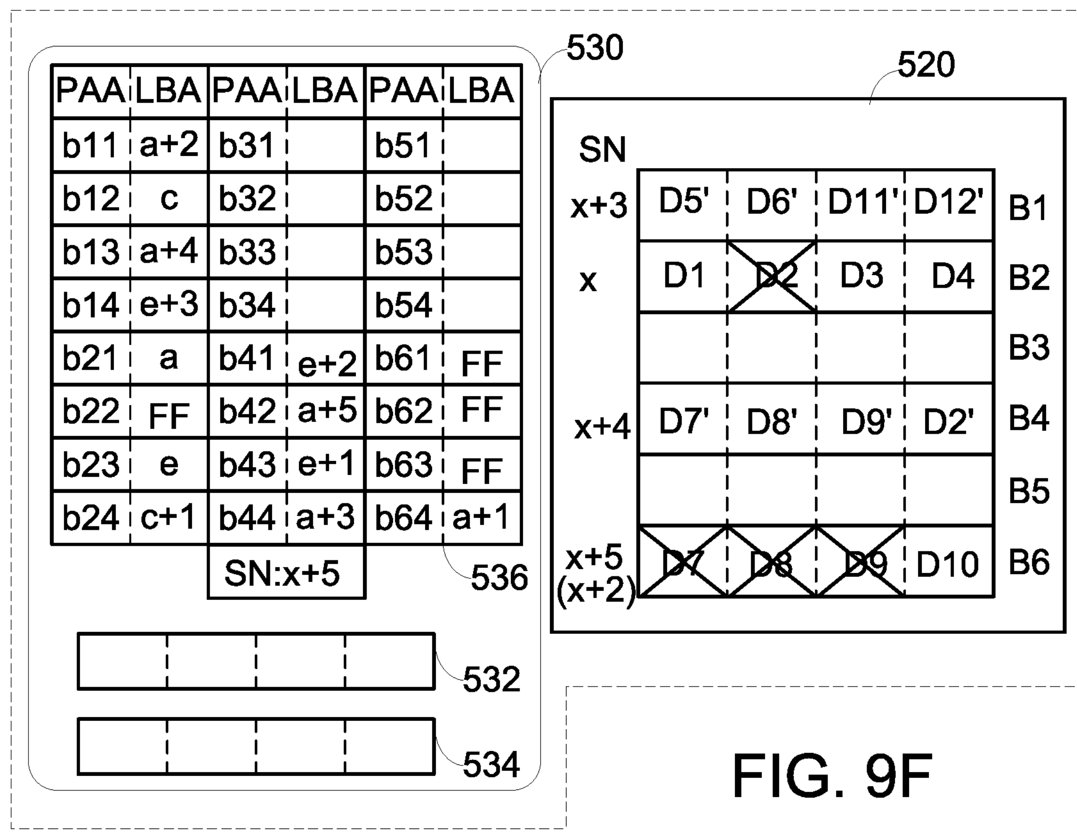

Obviously, the contents of FIG. 9F are completely identical to the contents of FIG. 7B. Meanwhile, the FTL table 536 is successfully rebuilt by the controlling circuit 510, and the FTL table 536 is restored to the state before the abnormal shutdown. Consequently, the solid state drive 50 can be normally operated.

As mentioned above, the storage space of the buffering circuit 530 of the solid state drive 50 is divided into plural storage areas, including the first data buffering area 532, the second data buffering area 534 and the flash translation layer table 536. Moreover, the first data buffering area 532 and the second data buffering area 534 are used for receiving and temporarily storing data from different sources. For example, the first data buffering area 532 is used for receiving and temporarily storing the write data from the host 12, and the second data buffering area 534 is used for receiving and temporarily storing the valid data during the garbage collection of the non-volatile memory 520.

While the data in the first data buffering area 532 and the second data buffering area 534 are written into the non-volatile memory 520, the block programming serial number corresponding to each block cannot reflect the sequences of writing and updating the block. For solving this drawback, the technology of the present invention uses the auxiliary serial number. While the data in the first data buffering area 532 and the second data buffering area 534 are written into the non-volatile memory 520, the controlling circuit 501 not only provides the block programming serial number to the open block but also provides an auxiliary serial number to the open block.

The flowchart of the flash translation layer table rebuilding method as shown in FIG. 8 is presented herein for purpose of illustration and description only. In accordance with the FTL table rebuilding method of the present invention, the block programming serial number of the FTL table is read after the controlling circuit confirms that the solid state drive 50 is suffered from an abnormal shutdown event, and the controlling circuit 510 determines plural blocks of the non-volatile memory to be read according to the block programming serial number. Moreover, the controlling circuit 510 determines the read sequence of reading these blocks according to a block programming serial number or an auxiliary serial number of each block, reads contents of the blocks according to the read sequence, and updates a mapping relationship between plural physical allocation addresses and plural logical block addresses of the flash translation layer table.

Moreover, in the non-volatile memory 520, the blocks containing data have corresponding block programming serial numbers. And, a part of blocks that stores data from the garbage collection not only have the corresponding block programming serial numbers but also have the corresponding auxiliary serial numbers. Moreover, by sorting the auxiliary serial numbers of the part of blocks and the block programming serial numbers of the other part of blocks in an ascending order, the controlling circuit 510 determines the read sequence of reading these blocks.

From the above descriptions, the present invention provides a solid state drive. In case that the solid state drive is suffered from an abnormal shutdown event, the flash translation layer table rebuilding method of the present invention can accurately rebuild the FTL table. Consequently, the solid state drive can be normally operated.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A flash translation layer table rebuilding method for a solid state drive, the solid state drive comprising a non-volatile memory, a buffering circuit, and a controlling circuit for rebuilding a flash translation layer table, the flash translation layer table rebuilding method comprising steps of:

loading a flash translation layer table from the non-volatile memory to the buffering circuit;

determining plural blocks of the non-volatile memory to be read according to a specified block programming serial number of the flash translation layer table; and determining a read sequence of reading the plural blocks according to a block programming serial number or an auxiliary serial number corresponding to the block, reading contents of the blocks according to the read sequence, and updating a mapping relationship between plural physical allocation addresses and plural logical block addresses of the flash translation layer table, wherein the plural blocks of the non-volatile memory have corresponding block programming serial numbers, and a part of the plural blocks have corresponding auxiliary serial numbers.

2. The flash translation layer table rebuilding method as claimed in claim 1, wherein the read sequence of reading these blocks is determined according to the auxiliary serial numbers corresponding to the part of the plural blocks and the block programming serial numbers corresponding to other part of the plural blocks.

3. The flash translation layer table rebuilding method as claimed in claim 1, wherein valid data to be moved during a garbage collection of the non-volatile memory are stored in the part of the plural blocks.

4. A solid state drive in communication with a host, the solid state drive comprising:

a controlling circuit connected with the host;

a non-volatile memory connected with the controlling circuit, wherein the non-volatile memory comprises plural blocks; and a buffering circuit connected with the controlling circuit, wherein a storage space of the buffering circuit is divided into a first data buffering area, and a second data buffering area, wherein a write data from the host is temporarily stored in the first data buffering area by the controlling circuit, and a valid data to be moved during a garbage collection of the non-volatile memory is temporarily stored in the second data buffering area by the controlling circuit, wherein the write data is written from the first data buffering area to a first block of the non-volatile memory, and the controlling circuit provides a first block programming serial number to the first block, wherein the valid data is written from the second data buffering area to a second block of the non-volatile memory, the controlling circuit provides a second block programming serial number and a first auxiliary serial number to the second block.

5. The solid state drive as claimed in claim 4, wherein the controlling circuit determines a read sequence of reading the first block and the second block according to the first block programming serial number and the first auxiliary serial number, and rebuilds a flash translation layer table according to the read sequence.

6. The solid state drive as claimed in claim 4, wherein the controlling circuit determines at least one block of the non-volatile memory to be read according to a specified block programming serial number of a flash translation layer table, and updates a mapping relationship between plural physical allocation addresses and plural logical block addresses of the flash translation layer table.

7. The solid state drive as claimed in claim 4, wherein while the garbage collection of the non-volatile memory is performed, the controlling circuit determines a block range to be subjected to the garbage collection according to a current block programming serial number, wherein the block range includes the blocks with block programming serial numbers lower than the current block programming serial number.

* * * * *